(12) United States Patent
Baiden

(10) Patent No.: US 8,310,238 B2
(45) Date of Patent: Nov. 13, 2012

(54) SUBSURFACE POSITIONING SYSTEM AND METHOD FOR MONITORING MOVEMENT UNDERGROUND

(75) Inventor: Greg Baiden, Lively (CA)

(73) Assignee: Penguin Automated Systems, Inc., Toronto (CA)

( * ) Notice: Subject to any disclaimer, the term of this patent is extended or adjusted under 35 U.S.C. 154(b) by 384 days.

(21) Appl. No.: 12/601,750

(22) PCT Filed: May 23, 2008

(86) PCT No.: PCT/CA2008/001015
§ 371 (c)(1),
(2), (4) Date: May 19, 2010

(87) PCT Pub. No.: WO2008/141465
PCT Pub. Date: Nov. 27, 2008

(65) Prior Publication Data
US 2011/0006774 A1 Jan. 13, 2011

(30) Foreign Application Priority Data
May 24, 2007 (CA) .................................... 2589820

(51) Int. Cl.
*G01V 3/00* (2006.01)
(52) U.S. Cl. .................. 324/334; 324/337; 324/344

(58) Field of Classification Search .................. None
See application file for complete search history.

(56) References Cited

U.S. PATENT DOCUMENTS

| | | | |
|---|---|---|---|
| 4,742,357 A | 5/1988 | Rackley | |
| 4,800,391 A | 1/1989 | Enge | |
| 5,155,442 A * | 10/1992 | Mercer | 324/690 |
| 5,585,726 A * | 12/1996 | Chau | 324/326 |
| 6,454,023 B1 | 9/2002 | Mercer et al. | |
| 6,552,548 B1 | 4/2003 | Lewis et al. | |
| 6,813,324 B1 | 11/2004 | Yewen | |
| 2005/0077085 A1 | 4/2005 | Zeller et al. | |
| 2009/0146864 A1 | 6/2009 | Zank et al. | |

FOREIGN PATENT DOCUMENTS

| | | |
|---|---|---|
| CA | 2 633 529 A1 | 7/2007 |
| WO | 2008049171 A1 | 5/2008 |

* cited by examiner

*Primary Examiner* — Minh N Tang
(74) *Attorney, Agent, or Firm* — Duane Morris LLP

(57) ABSTRACT

A system for monitoring movement in a subsurface environment, which may be used to determine flow dynamics within a fluid mass such as an ore body, or track subsurface persons or moving assets. A plurality of underground positioning system (UPS) elements in the subsurface environment transmit characteristic signals to a plurality of antennas, which transmit the signals to a data processing apparatus. The system thus determines changes in the positions of the UPS elements to derive an indication of the motion of the fluid mass or the locations and movement of subsurface persons or assets.

24 Claims, 28 Drawing Sheets

SUBSURFACE POSITIONING SYSTEM AND METHOD FOR MONITORING MOVEMENT UNDERGROUND

FIELD OF THE INVENTION

This invention relates to monitoring and positioning systems. In particular, this invention relates to a monitoring and positioning system particularly suitable for monitoring subsurface motion.

BACKGROUND OF THE INVENTION

Block cave mining is a method of mining that is gaining popularity, despite the fact that it has been in use for some years. One of the factors that hinders the advancement of block cave mining technology, however, is that it is difficult to determine what is happening inside the rock mass during the mining process. Some theories state that comminution may occur within the rock mass, although there continues to be little known about the rock dynamics with any degree of certainty.

A precise understanding of the actual flow of the ore body during the mining process would be advantageous, to ensure that current practices and knowledge about the block cave mining method are as efficient and complete as possible and to ensure that beneficial changes to operating techniques can be developed. Determining the rock breakage characteristics is of paramount importance to placing drawbells and accurately controlling the pull of the ore. More specifically, the ore body dynamics are important for a determination of the number of draw points required during mining, determination of the exact location of the cave front on a daily basis, the potential to alter tipping practices to use the contained energy in the ore body for enhanced comminution, and the safety of the miners based on knowledge of the cave front location and behaviour. Gathering rock flow information is difficult as the cave, once started, is completely independent inside the rock mass. Only gross controls, such as drawbell pulling, can be used to attempt to change the pull characteristics, but typically results are apparent significantly after the fact and correlation with changes are difficult to measure.

Several attempts have been made to determine what is occurring within the rock mass during the mining process. Generally, these attempts have taken the form of either markers or computer simulations.

Markers have been injected into the rock mass to try to determine the material flow characteristics. The markers have typically been made of steel and injected into the rock mass above the ore body. As the ore body starts to fracture, these markers begin to travel through to the rock mass to the draw bells below. These markers are collected and matched to entrance location and exit location. It is then assumed that the route of travel is a straight line between the two points representing the trajectory and thus the flow of the rock mass. Although some success has been achieved using this technique, the number and validity of assumptions underlying the technique and the lack of data due to loss of markers has resulted in limited effectiveness.

Computer software has also been used to simulate the flow of rock and several different simulation software systems exist. Some represent the rock as spheres while others use more rock-like shapes. The results of the computer simulations suggest that spherical rocks may be less able to represent reality than more realistic shapes. However, both of these methods suffer from a lack of empirical data and are of limited use.

There is no comprehensive measurement data from within the rock mass, or any other fluid mass, to gather real time information about the dynamics of the mass movement. In many cases, for example in mining, this is generally due to the physical constraints of entering the ore body with active sensing systems. For instance, sensors must be built so as to survive within the ore body, despite the high pressure and flow constraints. The sensing system must be robust enough to allow positioning within the ore body with sufficient accuracy that assumptions can be minimized. Such sensors must have a power system capable of lasting long periods of time while in the rock mass. The transmission system used must be capable of penetrating substantial thicknesses of rock of varying density in order to transmit and receive from the sensors. Also, an interface must be available for real time data analysis in order for the technical and operating personnel in the subsurface to determine information about the cave front.

A better understanding of the ore body flow would be beneficial to a number of aspects of the mining process. For instance, this information would be useful for the development of active mining control tools to control mining equipment. With a positioning system that can function within a rock mass, it would also be possible to develop a trapped miner rescue system based on the data through the use of an underground positioning system or "UPS." The UPS would enable the movement of each miner to be tracked so, in a catastrophic event, the location of each miner can be accurately determined making rescue operations more efficient. In addition, mine-wide asset management systems could be developed in order to improve efficiency of mining operations.

BRIEF DESCRIPTION OF THE DRAWINGS

In drawings that illustrate by way of example only a preferred embodiment of the invention.

DETAILED DESCRIPTION OF THE INVENTION

Figure 1:
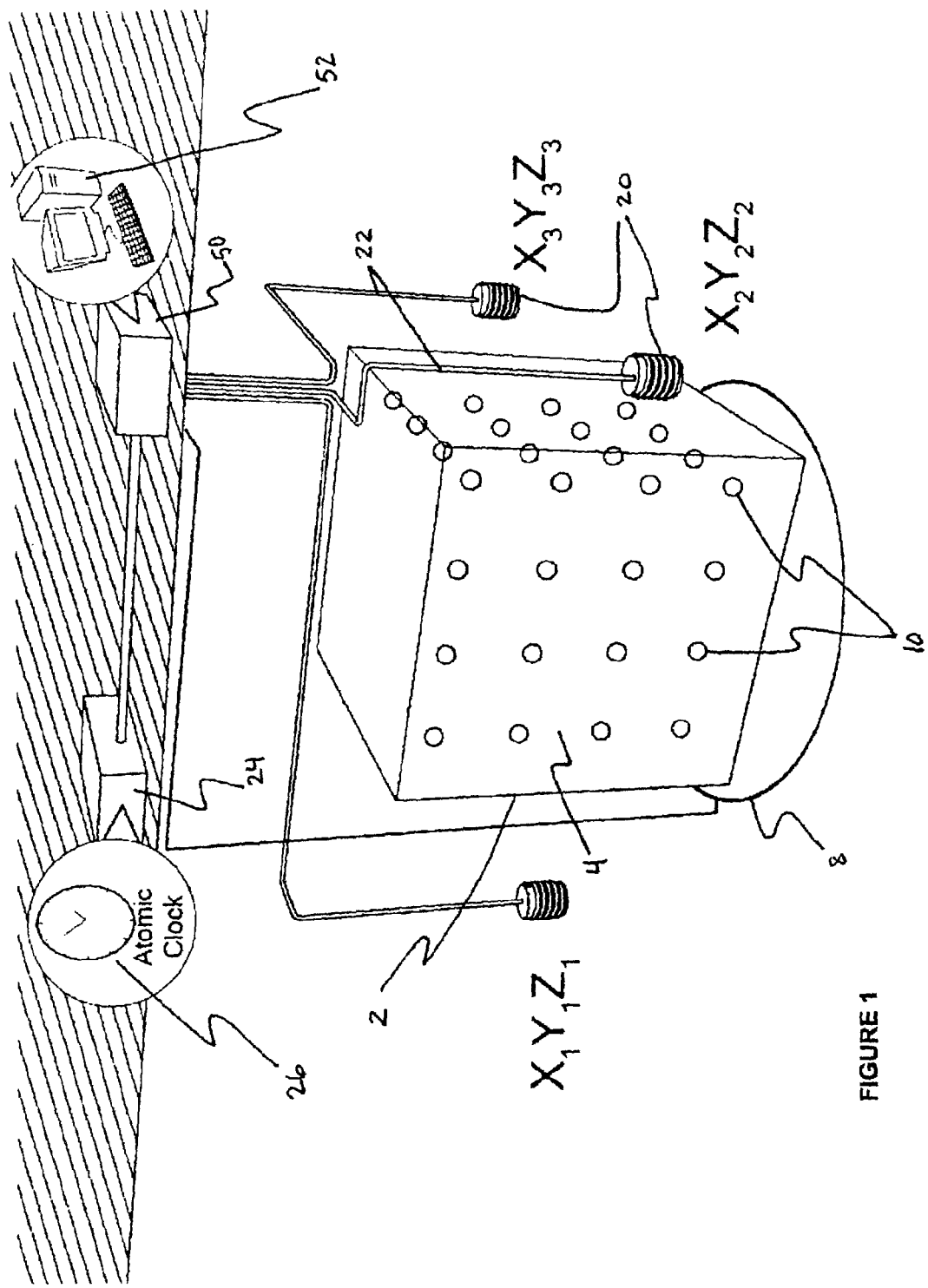
FIG. 1 is a schematic diagram of a basic subsurface positioning system according to the invention utilizing radio frequencies that are medium penetrating radio transmissions.

The present invention provides a subsurface positioning system, one preferred embodiment of which is illustrated in FIG. 1, and method, which is adaptable to virtually any subsurface environment or any fluid mass and is particularly suitable for use in block cave mining. The system and method of the invention will be described in the context of block cave mining, but it has applications in other environments and the description is not intended to be limiting in this regard. For instance, the system and method of the invention has application in most types of fluid materials, such as in mass movement in a fluid-plastic or viscous state, including mass creep, mass falls, mass slides, mass topples, or mass flows. This may include, by way of non-limiting example, movement of the soil, regolith, and rock by the force of gravity; mass movement resulting from slope failure, excavation or erosion; land slides; debris slides; debris flows; sand slides; sand flows; rock slides; rock flows; mud slides; mud flows; mud streams or lahars; soil, sediment or colluvium shifts, slides, or flows; riverbed movement; avalanches of snow, ice, rock or soil; ice flows; glacier flows; landfill, garbage, recycled goods or waste shifts or flows; human-made material flows; wastewater flow; or water flow. The system and method of the invention also has application as a positioning system for humans and assets in subsurface environments, which may include subterranean, submarine, or subglacial environments (both terrestrial and extra-terrestrial).

The present invention provides a system for monitoring motion in a subsurface environment, comprising: at least first, second and third antennas for transmitting electromagnetic radiation (emr) signals from which time of flight data can be derived, each coupled to at least one signal transmitter, the first antenna for transmitting first antenna signals associated with the first antenna, the second antenna for transmitting second antenna signals associated with the second antenna, and the third antenna for transmitting third antenna signals associated with the third antenna; a plurality of underground positioning system (UPS) elements disposed in spaced relation within the subsurface environment, each UPS element comprising at least one UPS transmitter for transmitting an emr UPS signal comprising at least an identifier associating the UPS signal with the transmitting UPS element and data relating to signals received from the at least first, second and third antennas; and at least one UPS receiver for receiving the first antenna signals from the first antenna, the second antenna signals from the second antenna and the third antenna signals from the third antenna; and a base station antenna coupled to a base receiver and positioned for receiving the UPS signals and transmitting the UPS signals, or signals corresponding to the UPS signals, to a data processing device; whereby as at least one of the UPS elements moves, the data processing device derives from the UPS signals a direction of movement of the at least one moving UPS element or a rate of movement of the at least one moving UPS element, or both.

The present invention further provides a position monitoring system for monitoring motion in a subsurface environment, comprising: a plurality of underground positioning system (UPS) elements for suspending within the subsurface environment, each UPS element comprising at least a signal transmitter for transmitting a characteristic emr signal having an identifier for associating the signal with the transmitting UPS element; a first antenna coupled to a first signal receiver and positioned for receiving the characteristic signals from the UPS elements and transmitting the characteristic signals, or signals corresponding to the characteristic signals, to a data processing apparatus; and at least a second antenna coupled to the first signal receiver or another signal receiver and positioned for receiving the characteristic signals from the UPS elements and transmitting the characteristic signals. or signals corresponding to the characteristic signals, to the data processing apparatus; whereby the data processing apparatus receiving the signals from the first antenna and the at least second antenna corresponding to the characteristic signals from the UPS elements determines a location of each transmitting UPS element associated with each characteristic signal as at least one moving UPS elements moves, based on a time of flight defined by a transmit time at which each characteristic signal is transmitted and a receipt time at which each characteristic signal is received by the antennas thereby providing an indication of at least a direction or rate, or both, of the movement of the at least one moving UPS element.

The present invention further provides, for use in a position monitoring system for monitoring motion in a subsurface environment comprising at least a first antenna coupled to a first signal receiver and positioned for receiving characteristic signals from the UPS elements and transmitting the characteristic signals to a data processing apparatus, an underground positioning system (UPS) element comprising at least: a housing, and a signal transmitter contained within the housing, for transmitting a characteristic emr signal having an identifier for associating the signal with the UPS element, whereby the data processing apparatus receiving the signals from the at least first antenna corresponding to the characteristic signals from the UPS elements determines a location of each UPS element associated with each characteristic signal as at least one moving UPS element moves, based on data from which time of flight data can be derived associated with each characteristic signal received by the at least first antenna, the characteristic signals transmitted by the UPS elements thereby providing an indication of at least a direction or rate, or both, of movement of the at least one moving UPS element.

The present invention further provides a method for monitoring motion in a subsurface environment, comprising the steps of: a. locating a plurality of underground positioning system (UPS) elements within the subsurface environment, each UPS element comprising at least a signal transmitter for transmitting a characteristic emr signal having an identifier for associating the characteristic signal with the transmitting UPS element; b. receiving the emr signals from the plurality of UPS elements at a first position in communication with the UPS elements, and transmitting data to a data processing apparatus corresponding to a time of receiving each emr signal at the first position; c. receiving the emr signals from the plurality of UPS elements at least at a second position in communication with the UPS elements, and transmitting data to the data processing apparatus corresponding to a time of receiving each emr signal at the second position; and d. processing the data to determine at least a direction or rate, or both, of movement of at least one moving UPS element.

In some embodiments of the system and method of the invention, time of flight data is derived at least in part from data provided to the antennas by an atomic clock. In some embodiments the at least one UPS transmitter is capable of retransmitting at least one UPS signal received from others of the plurality of UPS elements, and the UPS receiver is capable of receiving UPS signals from others of the plurality of UPS elements for retransmission, and the base antenna receives the UPS signals from at least one UPS element. In some embodiments each of the first, second and third antennas sequentially transmits a series of signal bursts, and time of flight data is derived at least in part from data identifying a phase shift between successive transmissions. In some embodiments at least some of the UPS elements comprise an acoustic receiver, and the system further comprises a plurality of acoustic transmitters for transmitting acoustic signals to the plurality of the UPS elements.

Each of the UPS elements 10 is self-powered, for example by a lithium battery, and preferably capable of transmitting and/or receiving individual positional data on an ongoing basis for a number of years, which may for example be by means of IP protocol. In the preferred embodiment, transmission of positional information occurs using a radio frequency transmission capable of penetrating the medium, for example in the embodiment shown a Very Low Frequency (VLF) radio transmission system. This system may be capable of data transmission through rock for distances of up to 2000 metres. However, other electromagnetic radiation (emr) transmission systems may be suitable depending upon the environment. Stratton, J. A., *Electromagnetic Theory*, McGraw-Hill (1941) provides a formula to calculate the electric and magnetic components of an electromagnetic wave in a medium as follows:

$$E = E_0 \cdot \exp(-\alpha z) \cdot \exp(i(\omega t - \beta z))$$

$$H = H_0 \cdot \exp(-\alpha z) \cdot \exp(i(\omega t - \beta z))$$

$$\delta = \frac{1}{\alpha} = \sqrt{\frac{2}{\omega \mu \sigma}} \text{ meters}$$

where:
$\alpha$=attenuation constant in Nepers
$z$=propagation distance in m
$\omega$=frequency in radians/s
$\beta$=phase constant in radians/m
$\mu$=magnetic permeability
$\sigma$=Conductivity in siemens/m
$\delta$=skin depth in meters=length at which wave attenuates to $$\frac{1}{e}$$

of its value

The penetration depth is affected by conductivity (mineral content) and water content (% moisture). If the rock mass is highly conductive, the energy of transmission will dissipate within a few metres. In block caving operations, however, the ore is relatively low grade, from 0.4% to 1%. Lower frequencies allow for greater penetration, but the difficulty of the precise timing of the signals is exacerbated.

FIG. 1 illustrates the basic positioning system used in the method of the invention, which relies on the principle of triangulation to localize a receiver to determine position using X, Y, Z coordinates. Each UPS element 10 broadcasts a coded emr signal, for example a VLF radio signal, including identifier information that can be discriminated by the base station computer 52 so the particular UPS element 10 from which the signal was sent is identifiable. The position of the UPS element 10 is localized as a point on a reference grid 4, representing the monitored region 2 containing the group of UPS elements 10.

Figure 2:
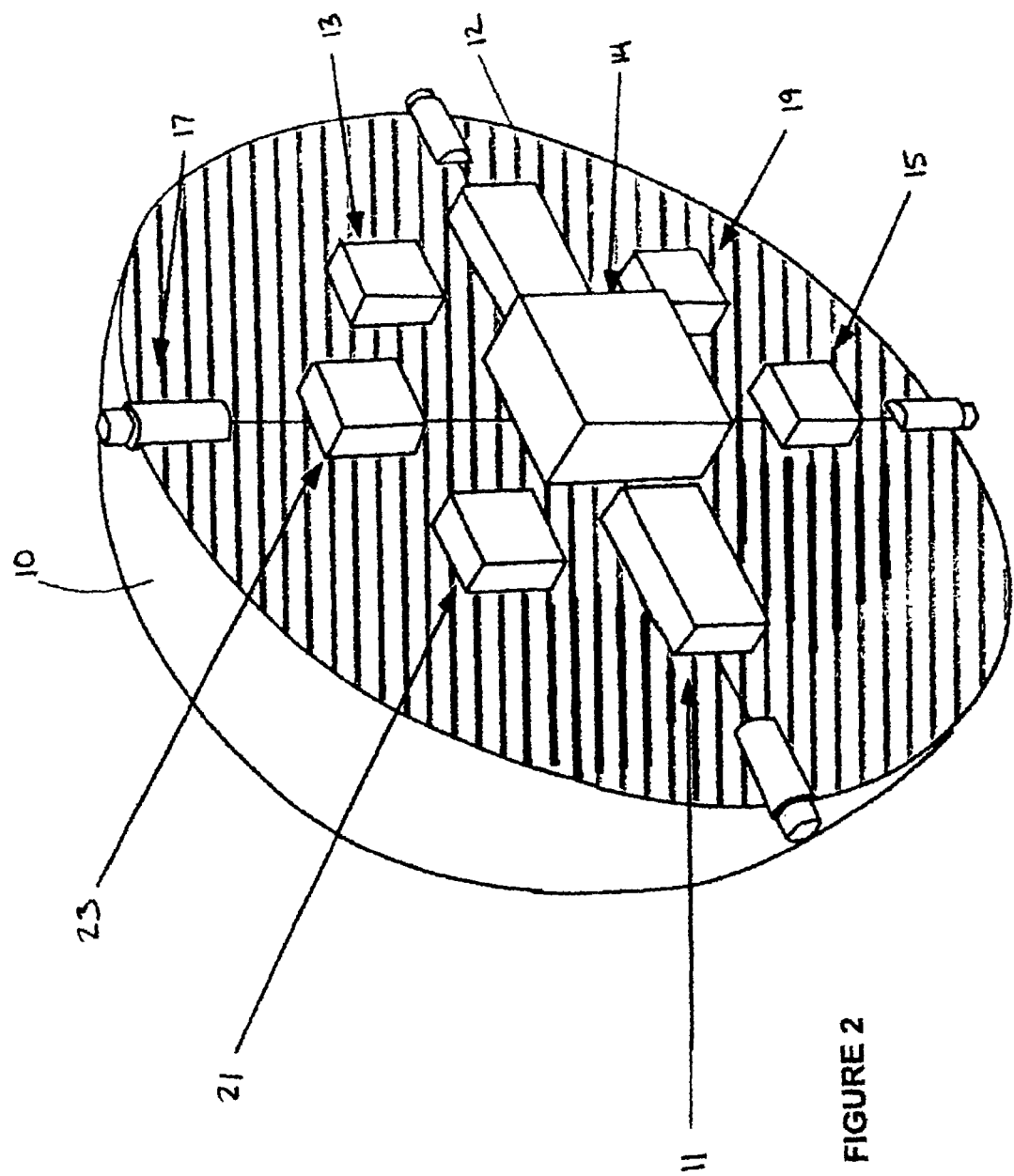
FIG. 2 is a schematic diagram of an Underground Positioning System (UPS) element suitable for the system of FIG. 1.

According to the invention, a group of UPS elements 10 is inserted into the rock mass. Each UPS element 10, illustrated schematically in FIG. 2, is with at least a power source 11 and preferably positioning instrumentation. The UPS elements 10 of the preferred embodiment are equipped with a device that has both transmission and receiving capability (for example a VLF transceiver (not shown)), although the UPS elements 10 may alternatively be equipped with a device that has transmission capability (for example VLF transmitter 19) and a separate device that has receiving capability (for example VLF receiver 21). Although shown schematically with a spherical casing 12, the casing may instead be configured irregularly to mimic the shape of a rock within the rock mass. An outer casing 12 houses an embedded computer 14 preferably with a triaxial gyroscope 13, at least one triaxial accelerometer 15 and internal strain gauges 17 and possibly a triaxial inclinometer 23. The strain gauges 17, while not part of the location system, can be useful for determining the forces acting on the UPS element 10.

To insert the UPS elements 10 into the rock mass within the monitored region 2 as shown in FIG. 1, typically boreholes are drilled from the surface or a tunnel above the rock mass. These holes are approximately 6-inches in diameter and extend down into the rock to the required depth for the deepest UPS elements 10. The UPS elements 10 are inserted and grouted into each borehole at a known elevation. The UPS elements 10 may be hung on a common power supply line (not shown) while in the borehole, to keep the batteries in the devices 10 fully charged until the rock mass begins to fail. These power lines prolong the battery power and thus the useful life of the UPS elements 10. As the ore body begins to break, the power lines will disconnect from the UPS elements 10 and the UPS elements 10 will automatically switch to battery power.

The initial system configuration for the preferred embodiment uses a reference grid 4 that represents the initial drilled locations of the UPS elements 10 within the monitored region 2. It will be appreciated that the initial system configuration can be other than the grid pattern shown in FIG. 1. For example, insertion of the UPS elements 10 in a fan pattern (not shown) rather than a grid pattern may allow for insertion of the UPS elements 10 into the monitored region 2 from generally the same position on the surface, such that the drilling machinery does not need to be moved to different locations during the insertion process. Accessibility to certain areas on the surface may also be a factor influencing the initial system configuration for UPS element 10 insertion into the subsurface.

Each UPS element 10 is embedded in a borehole and the initial location is logged in the 3D display software. The infrastructure consists of a base station computer 52 that manages VLF communication with the VLF antennas 20.

In the preferred embodiment of the present invention, there are at least first, second and third antennas for respectively transmitting first, second and third antenna emr signals, for example as in the embodiment shown VLF antennas 20. (There may be four or five VLF antennae 20, or more, if desired, circumscribing the rock mass at different levels, as shown for example in the embodiment of FIG. 8.) Each VLF antenna is 20 disposed within communications range of both the current and expected prospective positions of the rock mass. Most of the VLF antennae 20 in this embodiment only need to be capable of signal transmission and not signal reception, except for the base station antenna 8, which must be capable of signal reception as described below. The VLF antennae 20 are connected to an atomic clock station 24, for example via coax connecting cables 22, which contains or is connected to an atomic clock 26. Each connecting cable 22 is of equal length for each VLF antennae 20 that is connected to the atomic clock station 24, regardless of the distance of the VLF antennae 20 from the atomic clock station 24, so that the VLF antennae 20 are operating in synchronous time.

Figure 3A:
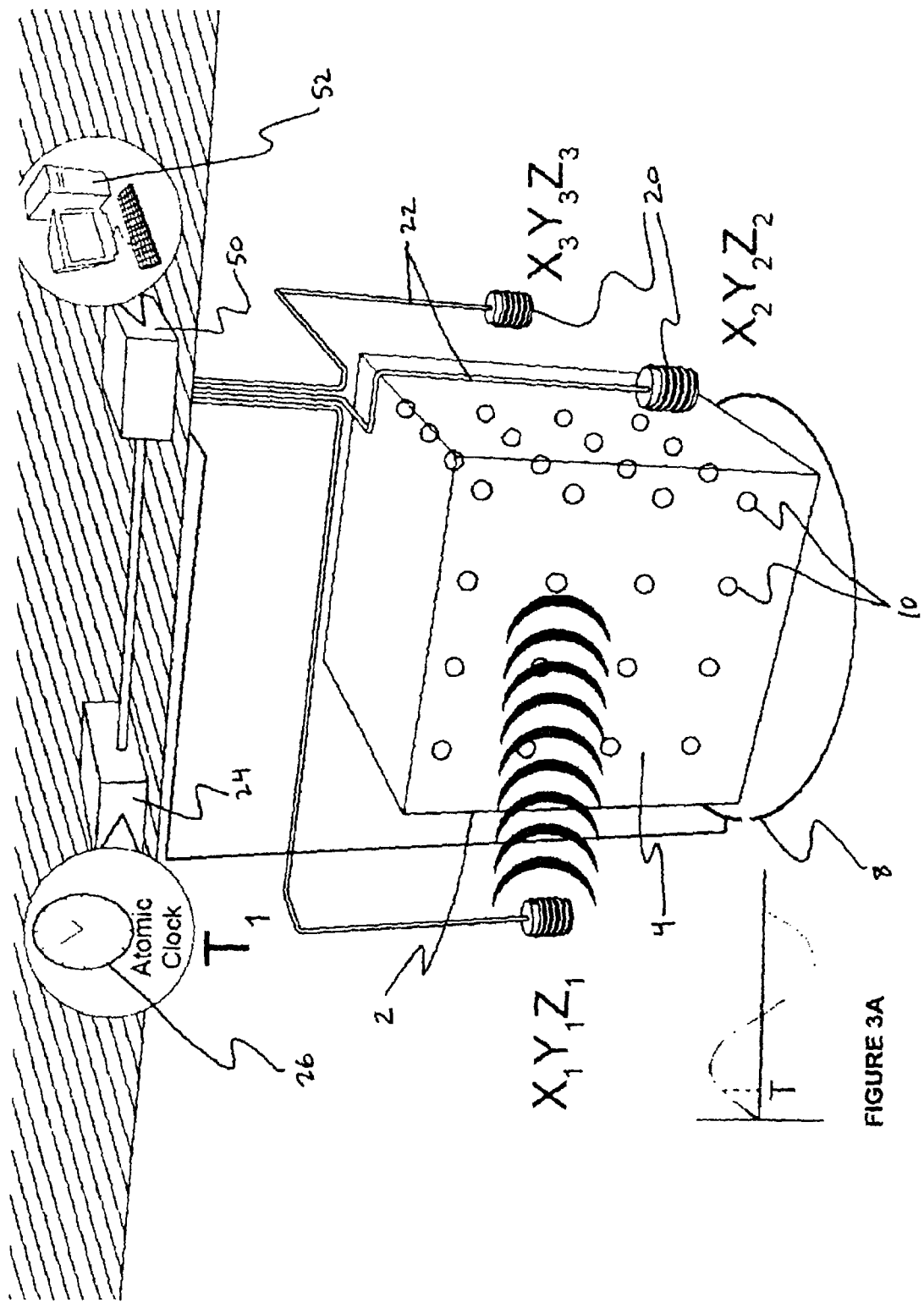
FIG. 3A to 3C are schematic diagrams of the subterranean positioning system of FIG. 1 showing transmission from the radio frequency antennae to the UPS elements from various positions.

Once the UPS element 10 begins to move with the rock mass, or within the rock mass, a first VLF antenna 20 transmits a first signal at time $T_1$ that contains time data from the atomic clock 26 and is received by an individual UPS element 10 and assigned coordinates $X_1Y_1Z_1$ based on that UPS element's position at the time the signal is received. $T_1$ thus corresponds to an initial position on a sine wave representing the time the first signal leaves the first VLF antenna 20, as shown in FIG. 3A. In the preferred embodiment, the first VLF antenna 20 transmits a burst of a predetermined number of pulses each, in turn, precisely calibrated to transmit at specified time intervals, for example every 5 milliseconds. This results in a phase measurement system that can be implemented in a digital measurement system using noisy signals. It also allows the UPS elements 10 to associate the pulses with the specific VLF antenna making the transmission, by the pulse count; for example, if the transmissions cycle between the VLF antennas 20 after each VLF antenna has emitted a specific number of pulses, say 10 pulses over 50 milliseconds, then it is known that after the first 10 pulses from the first VLF antenna 20 the signal is being transmitted from the second VLF antenna 20, and after 10 more pulses the signal is being transmitted from the third VLF antenna 20, etc.

Figure 3B:
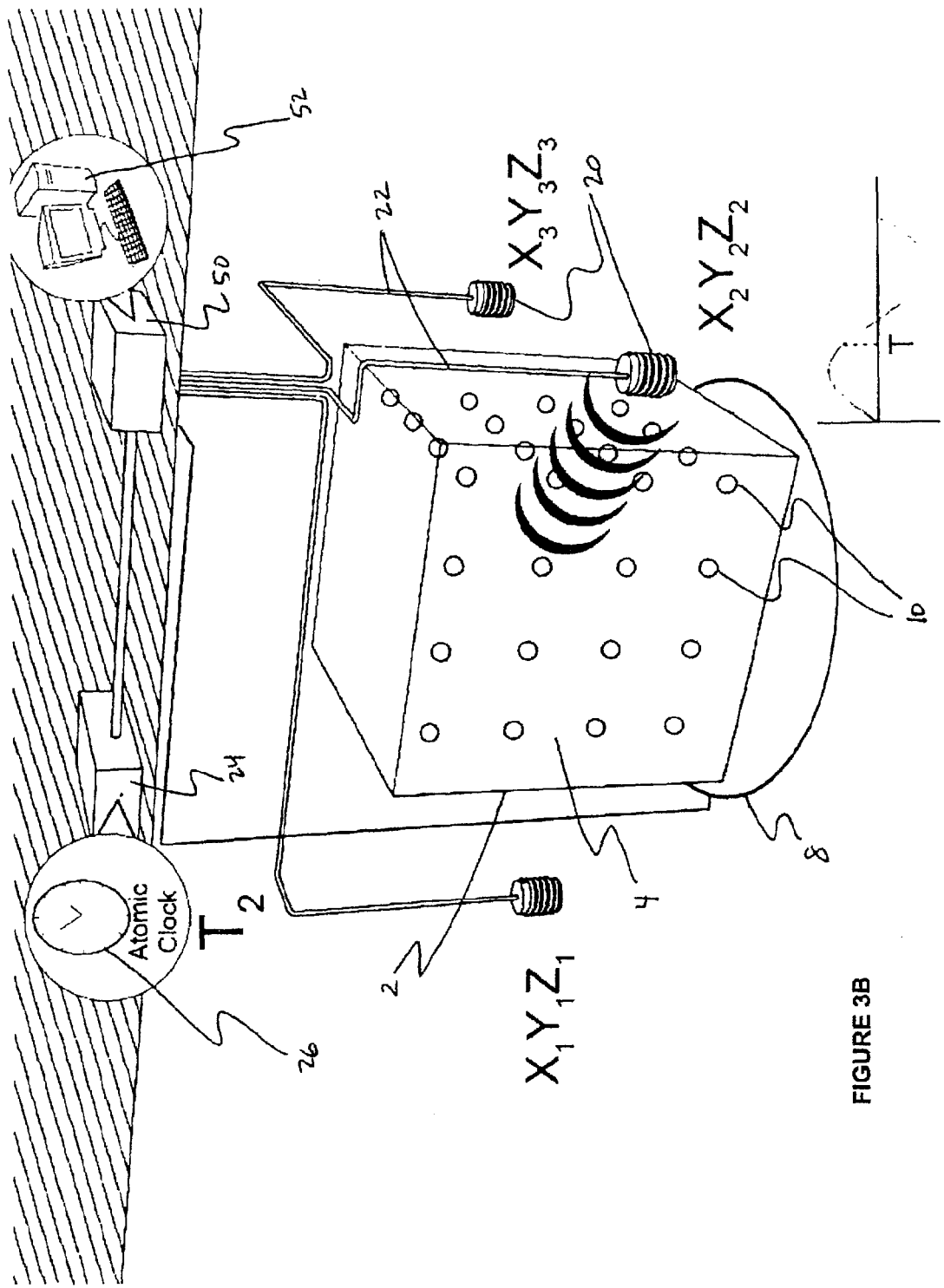

As all of the VLF antennae 20 are operating in synchronous time, $T_2$ corresponds to a second position on the sine wave representing the time a second signal leaves a second VLF antenna 20, as shown in FIG. 3B, which is received by the individual UPS element 10 and assigned coordinates $X_2Y_2Z_2$ based on the position of that UPS element 10 at the time the second signal (burst of pulses) is received. The second VLF antenna 20 thus transmits a second burst of pulses (which may commence immediately after the first VLF antenna 20 is finished sending the burst of pulses associated with the first VLF antenna 20) each, in turn, precisely calibrated to transmit at the specified time intervals, for example every 5 milliseconds.

Figure 3C:
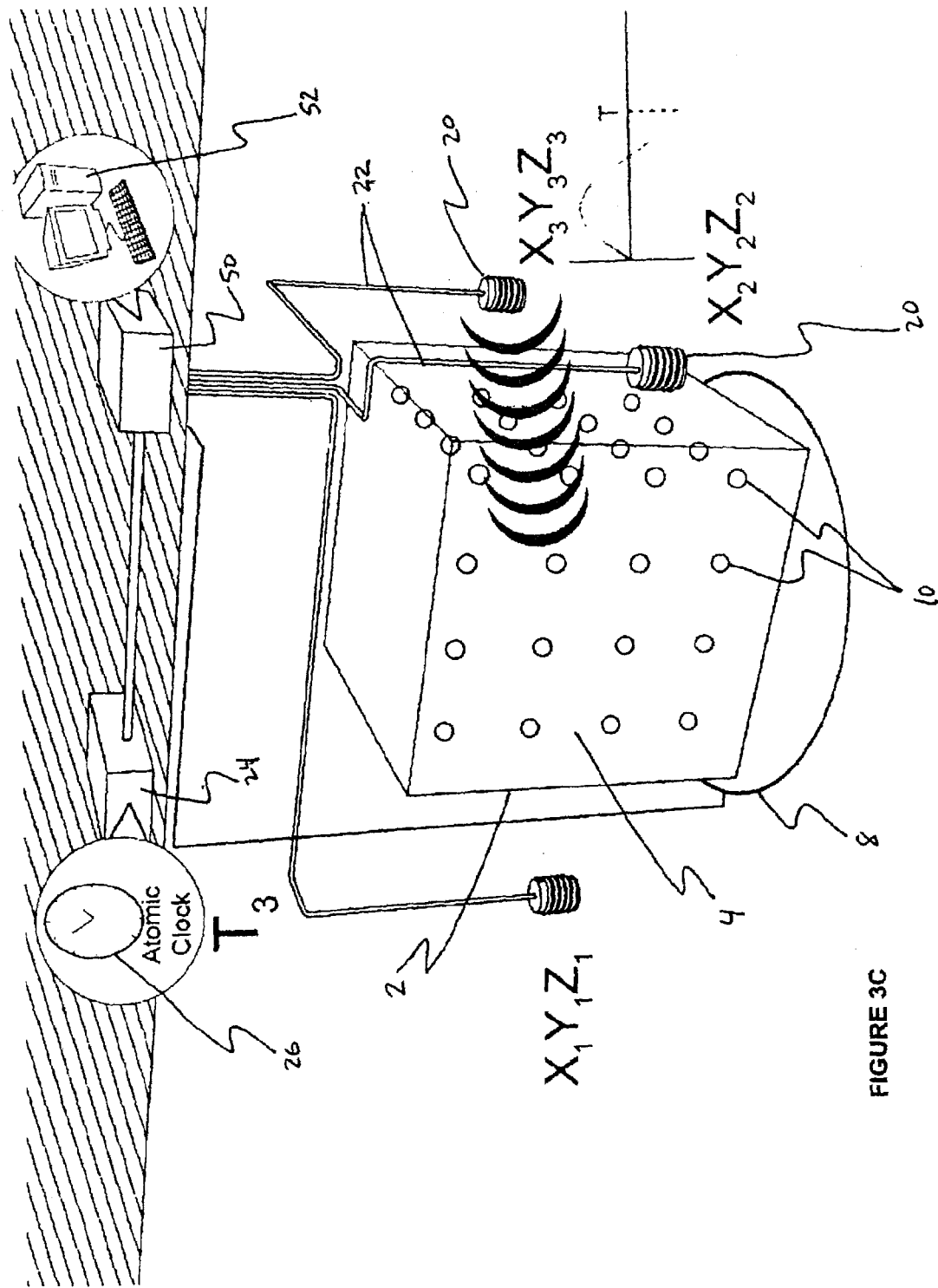

$T_3$ similarly corresponds to a third position on the sine wave representing the time a third signal leaves a third VLF antenna 20, if present, as shown in FIG. 3C, which is received by the individual UPS element 10 and assigned coordinates $X_3Y_3Z_3$ based on the position of that UPS element 10 at the time the third signal is received. The third VLF antenna 20 transmits a third burst of pulses (which may commence immediately after the second VLF antenna 20 is finished sending the burst of pulses associated with the second VLF antenna 20) each, in turn, precisely calibrated to transmit at the specified time intervals, for example every 5 milliseconds.

In this embodiment, the UPS elements 10 are each capable of signal transmission and reception. Once a UPS element 10 receives the signals from the VLF antennae 20, the UPS element 10 detects its position and then transmits a characteristic signal containing at least a unique identifier, and data representing the position of that UPS element 10 or time of flight. The characteristic signal from the transmitting UPS element 10 is received by all other UPS elements 10 within transmission range. The characteristic signals from other UPS elements 10 are similarly received and transmitted by UPS elements 10 within range to relay the data, in a cascading fashion, through the group of UPS elements 10, until the signals from all (or substantially all) UPS elements 10 have been received by the base station antenna 8.

Figure 4:
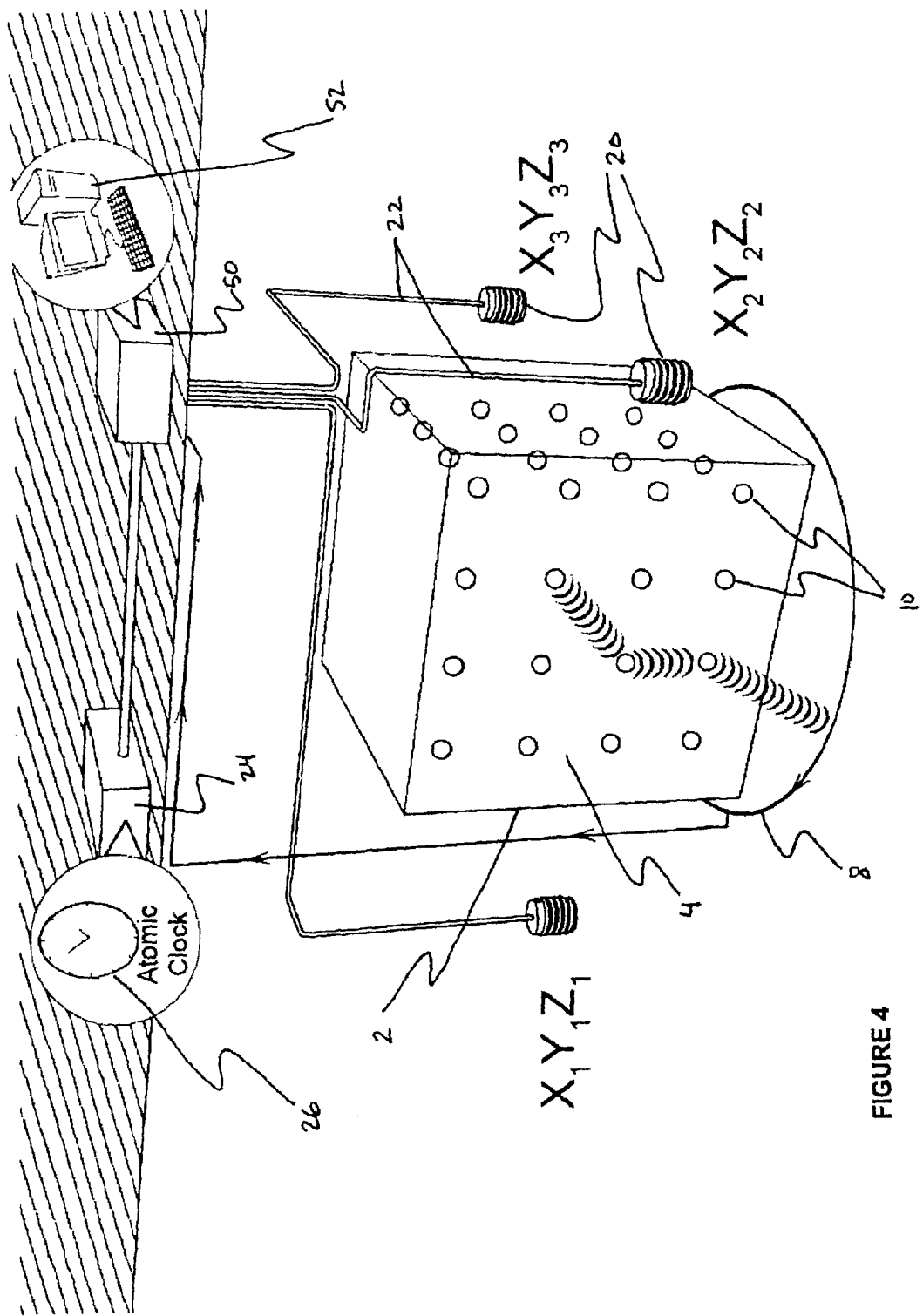
FIG. 4 is a schematic diagram of the subterranean positioning system of FIG. 1 showing the relay of transmissions from the UPS elements to the base radio frequency antenna.

The base station antenna 8 is disposed within communications range of both the current and expected prospective positions of the rock mass, in the case of block cave mining preferably (but not necessarily) at the base of the rock mass. Because the UPS elements 10 in this embodiment not only transmit their own data but also serve as repeaters to transmit data received from other UPS elements 10, the base station antenna 8 may be located anywhere within communication range of a single UPS element 10 in the current and expected positions of the rock mass. The base station antenna 8 receives from at least one of the UPS elements 10, likely the UPS element or elements in closest proximity to the position of the base station antenna 8, the relayed characteristic signals of all the UPS elements 10 containing positional data for each of the UPS elements 10 respectively associated with the unique identifier of each UPS element 10. The relay of data by UPS elements 10 to the base station antenna 8 is shown in FIG. 4.

The characteristic signals from all of the UPS elements 10 are then transmitted from the base station antenna 8 back to the base station computer 52, for example via coaxial cable. The base station computer 52 calculates any change in position of the UPS elements 10 based on the time of flight of the signals received by the UPS elements 10 from the VLF antennas 20. In this embodiment, time of flight can be derived from the phase differential between the multiple transmitted signals received and time-stamped by each UPS element 10, which have subsequently been relayed through the UPS element matrix to the base station antenna 8. The phase shift is proportional to the distance traveled by the signal, and can be calibrated to provide the (x, y, z) position in time for each UPS element 10, for example as follows.

The following describes a mathematical derivation of a phase measurement system that can be implemented in a digital measurement system using noisy signals. The averaging effect of the convolution process reduces the error in the final measurement. The following formulae are provided for an understanding of at least one manner in which data provided by the invention may be analyzed and utilized. However, the method of the invention relates to a system for generating positional data, and is not intended to be limited by how the data is processed or used.

From Maxwell's equations, the electric field at time t and position x can be written as:

$$E(x,t)=E_o e^{i(\omega t - \lambda x)}$$

where:
$\lambda$=wavelength (also equal to v/f; velocity/frequency)
x=position (distance) in m
$\omega$=frequency in radians/s Without loss of generality, the signal being transmitted can be considered as a sine wave:

$$S=\sin(\omega t)$$

A receiver (and thus a UPS element 10) at position (x, y, z) can be considered within a volume. Assume four transmitters (i.e. antennae 20), A, B, C and D, located at points $(x_A, y_A, z_A)$, $(x_B, y_B, z_B)$, $(x_C, y_C, z_C)$ and $(X_D, y_D, Z_D)$ each transmitting a burst of sine waves each in turn, precisely calibrated to commence (for example) every 5 milliseconds. The signals received by the receiver will be $S=\sin(\omega t+\delta t)$, where $\delta t$ is the time of flight of the signal. This can be thought of as producing a phase shift that will be different for each source. This phase shift expressed in terms of the signal wavelength would be, for example, from transmitter A to the receiver:

$$\theta_A = \frac{D_A}{\lambda}$$

where $D_A$ is the distance from transmitter A to the receiver, and $\lambda$ is the wavelength of the frequency of interest in the medium. Converting the phase shift to a distance is accomplished by the following:

$$D_A = \lambda \frac{\text{meters}}{360 \text{ degrees}} \times \theta_A \text{degrees}$$

Expressing the received signal in terms of a sine wave with a phase shift, there are four equations:

$$S_A = \sin(\omega t + \theta_A)$$

$$S_B = \sin(\omega t + \theta_B)$$

$$S_C = \sin(\omega t + \theta_C)$$

$$S_D = \sin(\omega t + \theta_D)$$

The signals can be stored in circuitry on board the UPS element 10 that can numerically determine the phase shift $\theta$ for each signal. It may also be possible for all of this information to be transmitted back to the base station computer 52 for such calculations. Absolute phase cannot be measured at the receiver, only relative phase differences. The phase differences represent hyperbolic curves, and the intersection of the curves provides the (x, y, z) position of the receiver. Four transmitters are preferred to provide enough information for the three variables that will locate the receiver with the preferred degree of accuracy. The position of the receiver may be determined if only three transmitters are used, although the result will be less accurate.

The distance between two points in space located at (x, y, z) and $(x_A, y_A, Z_A)$ is given by the 3D version of the Pythagorean theorem:

$$D = \sqrt{(x-x_A)^2 + (y-y_A)^2 + (z-z_A)^2}$$

By measuring the phase differences between successive transmissions, it is possible to convert this to a difference in the distance between the distances from the receiver and two of the transmitters. Define $D_{AB}$ as the difference between $D_A$ and $D_B$ as defined above. The differences in distance can be expressed as:

$$D_A - D_B = D_{AB} = \sqrt{(x-x_A)^2 + (y-y_A)^2 + (z-z_A)^2} - \sqrt{(x-x_B)^2 + (y-y_B)^2 + (z-z_B)^2}$$

$$D_A - D_C = D_{AC} = \sqrt{(x-x_A)^2 + (y-y_A)^2 + (z-z_A)^2} - \sqrt{(x-x_C)^2 + (y-y_C)^2 + (z-z_C)^2}$$

$$D_C - D_B = D_{CB} = \sqrt{(x-x_C)^2 + (y-y_C)^2 + (z-z_C)^2} - \sqrt{(x-x_B)^2 + (y-y_B)^2 + (z-z_B)^2}$$

$$D_C - D_D = D_{CD} = \sqrt{(x-x_C)^2 + (y-y_C)^2 + (z-z_C)^2} - \sqrt{(x-x_D)^2 + (y-y_D)^2 + (z-z_D)^2}$$

Rearranging the equations gives:

$$D_{AB} - \sqrt{(x-x_A)^2 + (y-y_A)^2 + (z-z_A)^2} = \sqrt{(x-x_B)^2 + (y-y_B)^2 + (z-z_B)^2}$$

$$D_{AC} - \sqrt{(x-x_A)^2 + (y-y_A)^2 + (z-z_A)^2} = \sqrt{(x-x_C)^2 + (y-y_C)^2 + (z-z_C)^2}$$

$$D_{CB} - \sqrt{(x-x_C)^2 + (y-y_C)^2 + (z-z_C)^2} = \sqrt{(x-x_B)^2 + (y-y_B)^2 + (z-z_B)^2}$$

$$D_{CD} - \sqrt{(x-x_C)^2 + (y-y_C)^2 + (z-z_C)^2} = \sqrt{(x-x_D)^2 + (y-y_D)^2 + (z-z_D)^2}$$

By squaring both sides of each equation and simplifying, the following system of equations results:

$$\sqrt{(x-x_A)^2 + (y-y_A)^2 + (z-z_A)^2} = [-D^2_{AB} + 2xx_A - x^2_A + 2yy_A - y^2_A + 2zz_A - z^2_A - 2xx_B + x^2_B - 2yy_B + y^2_B - 2zz_B + z^2_B]/(-2D_{AB})$$

$$\sqrt{(x-x_A)^2 + (y-y_A)^2 + (z-z_A)^2} = [-D^2_{AC} + 2xx_A - x^2_A + 2yy_A - y^2_A + 2zz_A - z^2_A - 2xx_C + x^2_C - 2yy_C + y^2_C - 2zz_C + z^2_C]/(-2D_{AC})$$

$$\sqrt{(x-x_C)^2 + (y-y_C)^2 + (z-z_C)^2} = [-D^2_{CB} + 2xx_C - x^2_C + 2yy_C - y^2_C + 2zz_C - z^2_C - 2xx_B + x^2_B - 2yy_B + y^2_B - 2zz_B + z^2_B]/(-2D_{CB})$$

$$\sqrt{(x-x_C)^2 + (y-y_C)^2 + (z-z_C)^2} = [-D^2_{CD} + 2xx_C - x^2_C + 2yy_C - y^2_C + 2zz_C - z^2_C - 2xx_D + x^2_D - 2yy_D + y^2_D - 2zz_D + z^2_D]/(-2D_{CD})$$

This system of equations can be solved to provide the x, y and z coordinates of the receiver, and thus of the transmitting UPS element 10. Other systems may be used to calculate the positions of the UPS elements from their respective transmissions.

Although the present embodiment has been described in the context of block cave Mining in which the UPS elements 10 are inserted into the rock mass via boreholes, it will be appreciated by the person skilled in the art that the UPS elements 10 may also be affixed to humans (for example, miners) or assets—such as machinery, vehicles or automated devices—within a subsurface environment (including an underwater environment), and perform the same function. The person or asset (with the UPS element 10 attached) may be in a tunnel within a rock body or in a body of water. As the person or asset moves through subsurface environment, the attached UPS element 10 functions in a similar fashion as when entrained in the rock strata as described above. The position of the attached UPS element 10 provides information about the movement and position of the person or asset within the subsurface environment.

It will thus be appreciated by the person skilled in the art that the invention described herein may be used in any subsurface environment in which a radio frequency transmission is capable of penetrating the medium. For example, the present invention has application in submarine environments where the UPS elements 10 may be used to determine the flow characteristics of the water, or for the position of humans (for example, divers) or assets at any given depth, for example on the bed of the water body, such as the ocean floor. The present invention also has application in other environments, such as in extra-terrestrial or nano-environments. The functionality of the present invention is not frequency dependent. The frequency can be selected to suit the particular environment in which the positioning system of the present invention is employed. In micro-environments a higher frequency may be used, whereas in a macro-environment a very low frequency may be used.

Figure 5:
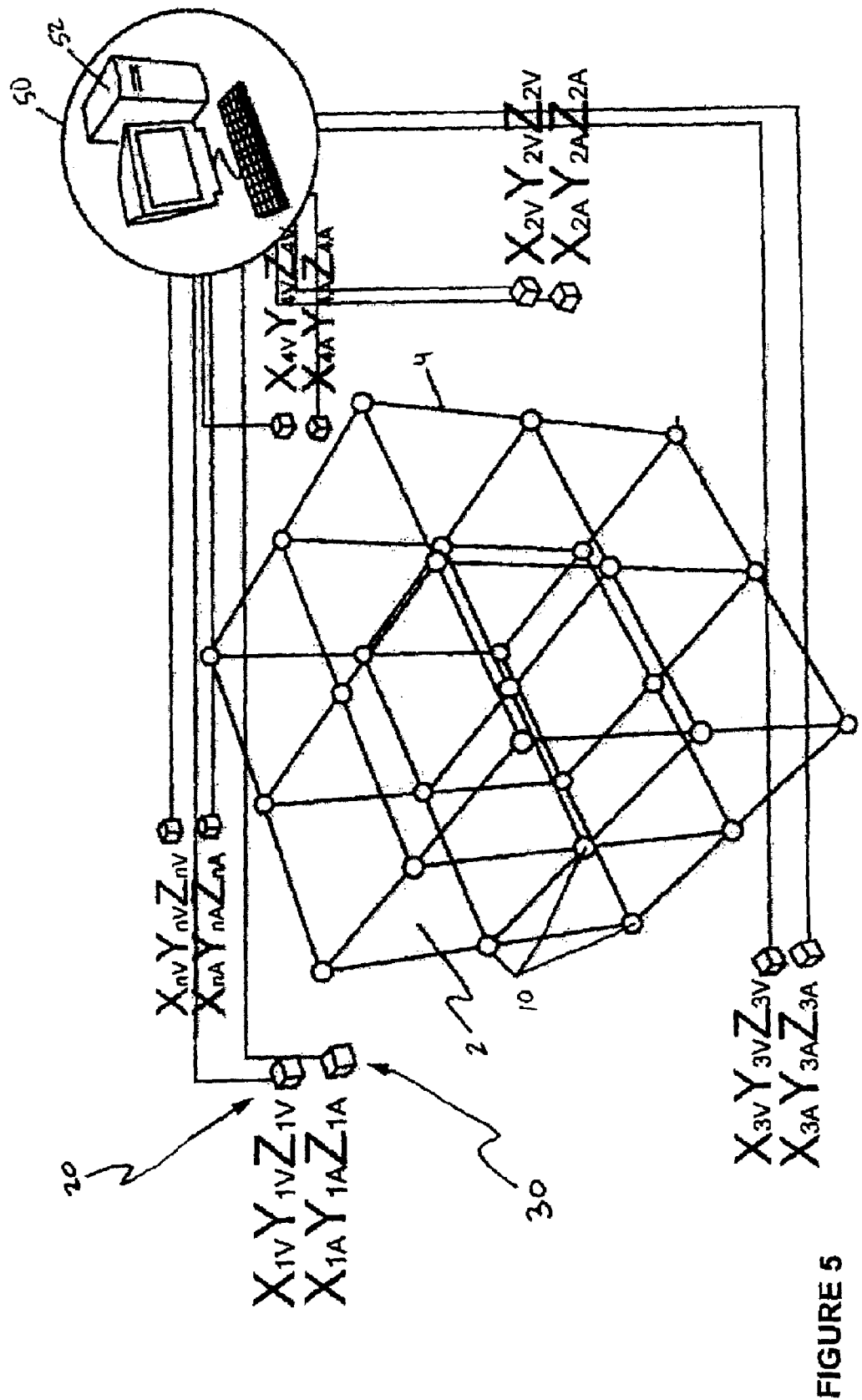
FIG. 5 is a schematic diagram of a basic subterranean positioning system according to the invention utilizing a combination of radio frequencies that are medium penetrating radio and acoustic transmissions.

In another embodiment of the present invention, each UPS element 10 is provided with its own atomic clock 18 and generates time data internally, from which time of flight to each VLF antenna 20 may be determined, for transmission to the base station antenna 8. Once the rock mass begins to move, the UPS elements 10 transmit positional data, or data from which positional data may be derived such as time data, which is received by at least two VLF antennas 20 disposed within communications range of both the current and expected prospective positions of the rock mass, and preferably three, four or five VLF antennas 20 circumscribing the rock mass at different levels similar to those VLF antennas 20 shown in FIG. 5. In this embodiment the VLF antennas 20 receive the signals from the UPS elements 10 and transmit the received signals to the base station 50. In this embodiment, UPS elements 10 capable of signal transmission and reception are preferred, but UPS elements 10 capable of signal transmission and not signal reception can also be used. All the antennas 20 may be coupled to signal transmitter (not shown), or each antenna may be coupled to its own signal transmitter, for transmitting the received signal to the base station 50.

As noted above, based on the spatial variation between the intermittent signals transmitted from each UPS element 10, the spatial path each UPS element 10 follows over time is determined. From this information, empirical information about the flow path, rate of flow, and the dynamic characteristics of the cave is calculated. The data may be plotted on a three-dimensional "Geographic Information System" or GIS. The system provides empirical data the analysis of which allows for an understanding of the flow dynamics within the rock mass. This data can be more accurate if the UPS element 10 is housed in a casing which approximates the shape of a rock in the rock mass.

In this embodiment, the position of the UPS element 10 may be determined by Equation E1:

$$\begin{cases} (x - xi)^2 + (y - yi)^2 + (z - zi)^2 = (Ri)^2 \\ i = 1, 2, 3, 4 \end{cases} \quad (E1)$$

Equation E1 can be solved using several methods in order to reduce the positioning error of the UPS element 10. The preferred method is to add the delays in the right side of the equations and simulate the solutions until the errors are reduced to a minimum value.

To improve the accuracy of the system, a mathematical algorithm for positioning may be employed in order to correct for variation of signal characteristics due to travel within the rock mass. The first approach to the mathematical algorithm is reference to a specific type of signal, such as an acoustic signal. The correcting algorithm can then be extended to any kind of signal, since a general formula for any type of known signal can be modeled using the wave equation derived by the combination of three main properties in physics, namely the conservation of momentum, the conservation of mass, and the incompressible fluid equation.

The general wave equation for acoustic signals is given by:

$$\nabla^2 S = \frac{\rho}{K} \frac{\partial^2 S}{\partial t^2}, \quad (E2)$$

$$S(u, t) = S_0 \sin(ku - wt)$$

$$\rho = \text{mass\_density}$$

$$K = \text{Bulk\_modulus\_elasticity}$$

As preferably four VLF antennas 20 receive positional signals from the UPS elements 10 in order to precisely determine the position of the rock in the cave, an estimate of the position of the rock is to solve the system of equations (E2) as follows:

$$\begin{cases} (x - x1)^2 + (y - y1)^2 + (z - z1)_2 = (R1)^2 \\ 2x(xi - x1) + 2y(yi - y1) + 2z(zi - z1) = R1^2 - R1^2 - (x1^2 - xi^2) - \\ (y1^2 - yi^2) - (z1^2 - zi^2) \\ i \neq 1 \end{cases} \quad (E2)$$

This method consists of keeping equation 1 and replacing the others by subtracting 1 from each of them. This leads to a system of the form AX+BX+CZ=which is a linear system of equation that can easily be solved. However, once a solution is determined, it must verify the first non-linear (or spherical) equation. This can be a challenge if the distances Ri are assumed to be constant. The system may result in an empty set solution in a pure mathematical form. However, this assumes that the distance from each source to the UPS element 10 is a constant, which would mean that the time of flight of the signal in the rock environment is known with absolute certainty. This is not the case, in general.

Figure 6:
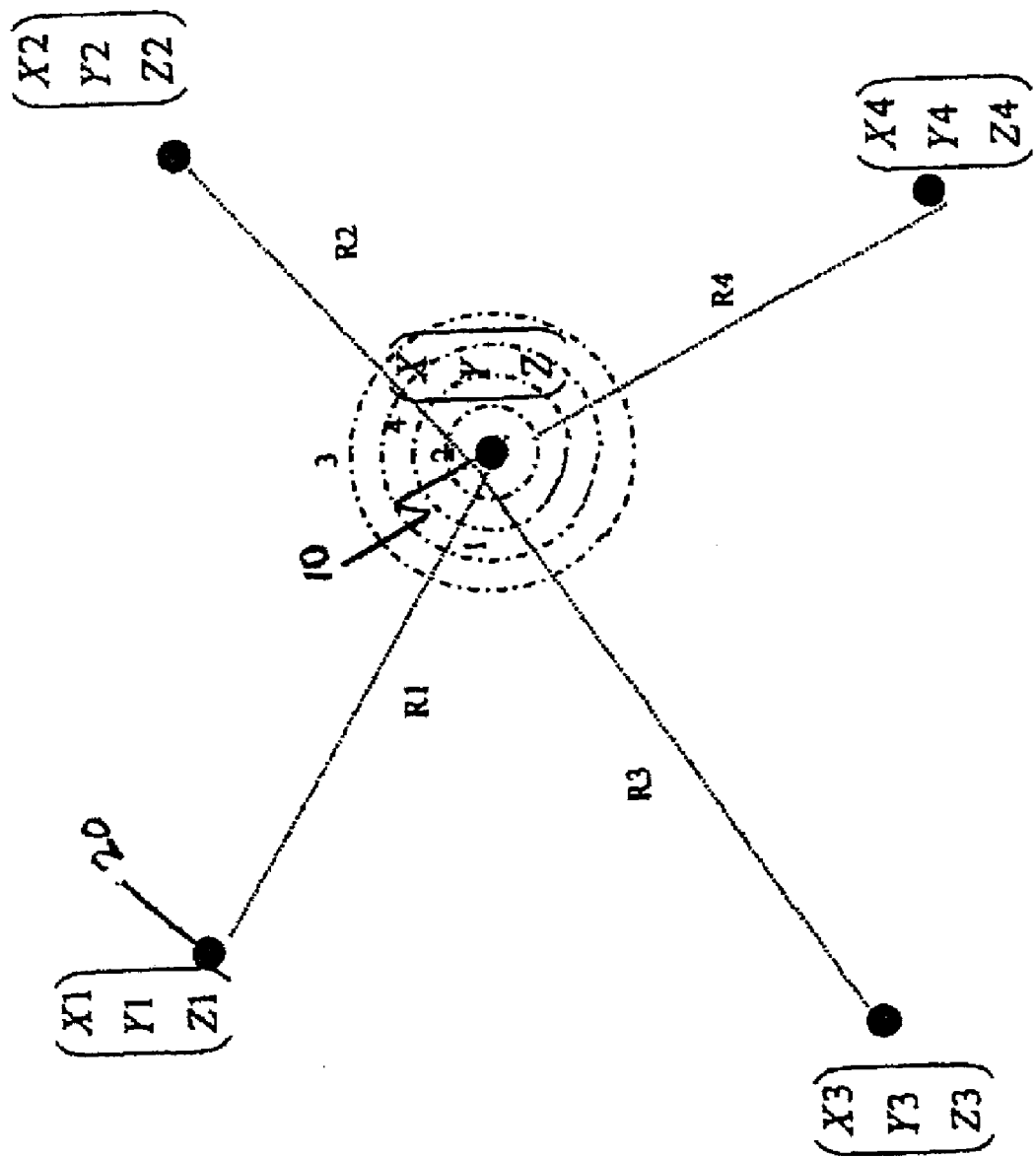
FIG. 6 is a schematic diagram of a triangulation system using a probabilistic function for determining time of flight.

FIG. 6 illustrates the situation where the time of flight of each signal is probabilistic. As more sources are added to the system, the zone of uncertainty shrinks, leading to a better approximation of the position. Equation (E1) can be transformed to include the uncertainty zone as follows:

$$\begin{cases} (x - xi)^2 + (y - yi)^2 + (z - zi)^2 = (c_i t_i)^2 \\ c_i = \text{speed\_of\_signal} \\ t_i = \text{probabilistic\_time\_of\_flight} \\ i = 1, 2, 3, 4 \end{cases} \quad (E3)$$

Figure 7:
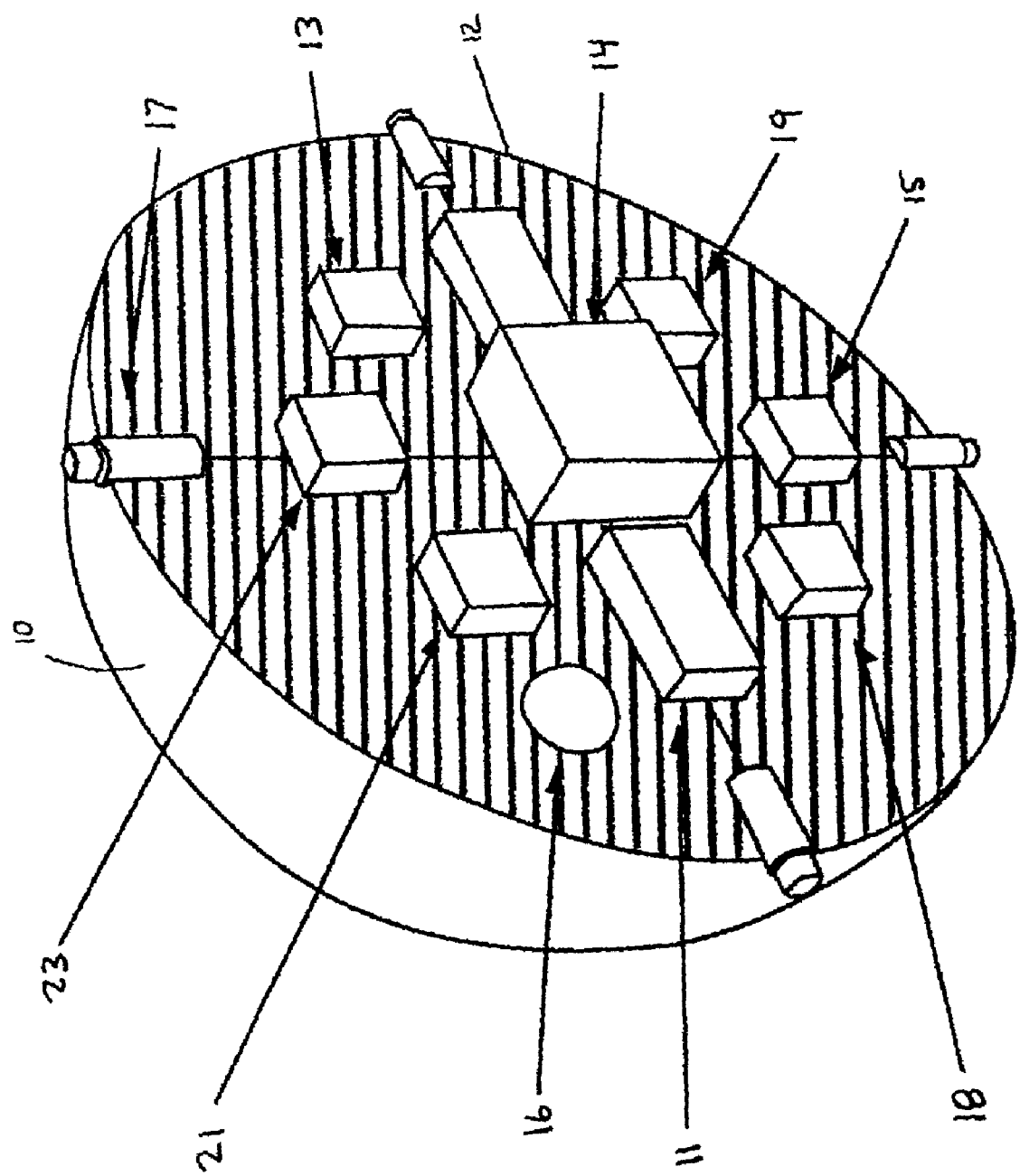
FIG. 7 is a schematic diagram of an Underground Positioning System (UPS) element suitable for the system of FIG. 5.

In another embodiment of the present invention, atomic clocks 18 are used in combination with acoustic cave front analysis. This embodiment combines acoustic and very low frequency (VLF) radio transmissions, and has the ability to provide very accurate and useful information about the cave front behaviour. This design, although more complex than the embodiment described above, has the potential to provide higher quality information on rock movement and composition. FIG. 7 shows a UPS element suitable for this embodiment, with a microphone 16 for receiving acoustic signals and an atomic clock 18.

Waves that travel at the speed of light through rock will likely arrive more quickly than acoustic waves, because sound waves do not travel as quickly through rock as radio waves do. Generally, this difference is due to the presence of fractures in the rock. For example, when a radio signal and acoustic signal are sent simultaneously, once the radio wave (that traveled at the speed of light) and acoustic wave arrive at the UPS element 10, the relative difference in arrival time is an indication of the quality of the rock through which the signals passed, i.e. the number and degree of fractures. The atomic clock 18 must have very high resolution due to the close distances between UPS elements 10 and the fact that VLF radio transmission takes place at the speed of light.

Communication to and from the UPS elements 10 in this embodiment occurs via a VLF radio network using a plurality of VLF antennas 20. The VLF antennas 20 are installed around the ore body in known locations $(X_{1V}, Y_{1V}, Z_{1V})$, $(X_{2V}, Y_{2V}, Z_{2V})$ and $(X_{3V}, Y_{3V}, Z_{3V})$. The acoustic technology in this embodiment includes a combination of external acoustic transmitters or generators 30 for positioning and use of the VLF antennas 20. The acoustic transmitters 30 are installed around the ore body in known locations $(X_{1A}, Y_{1A}, Z_{1A})$, $(X_{2A}, Y_{2A}, Z_{2A})$ and $(X_{3A}, Y_{3A}, Z_{3A})$. Preferably, each acoustic transmitter 30 is connected to the base station 50.

In the operation of this embodiment, the UPS elements 10, acoustic transmitters 30, and VLF antennas 20 are positioned as described above. As a UPS element 10 begins to move, a motion detector inside each UPS element 10 is activated. Triaxial clinometers, accelerometers, and strain gauges collect the data from the UPS element 10 movement. This information provides data about the movement of the individual UPS element 10, which is stored in the memory of the UPS element on-board computer 14 for transmission to the VLF antennas 20 and then via the VLF, antennae 20 network to the base station 50, where the data is input into the mathematical equations for resolving. In this embodiment, all atomic clocks must first be synchronized to ensure accuracy.

Figure 8:
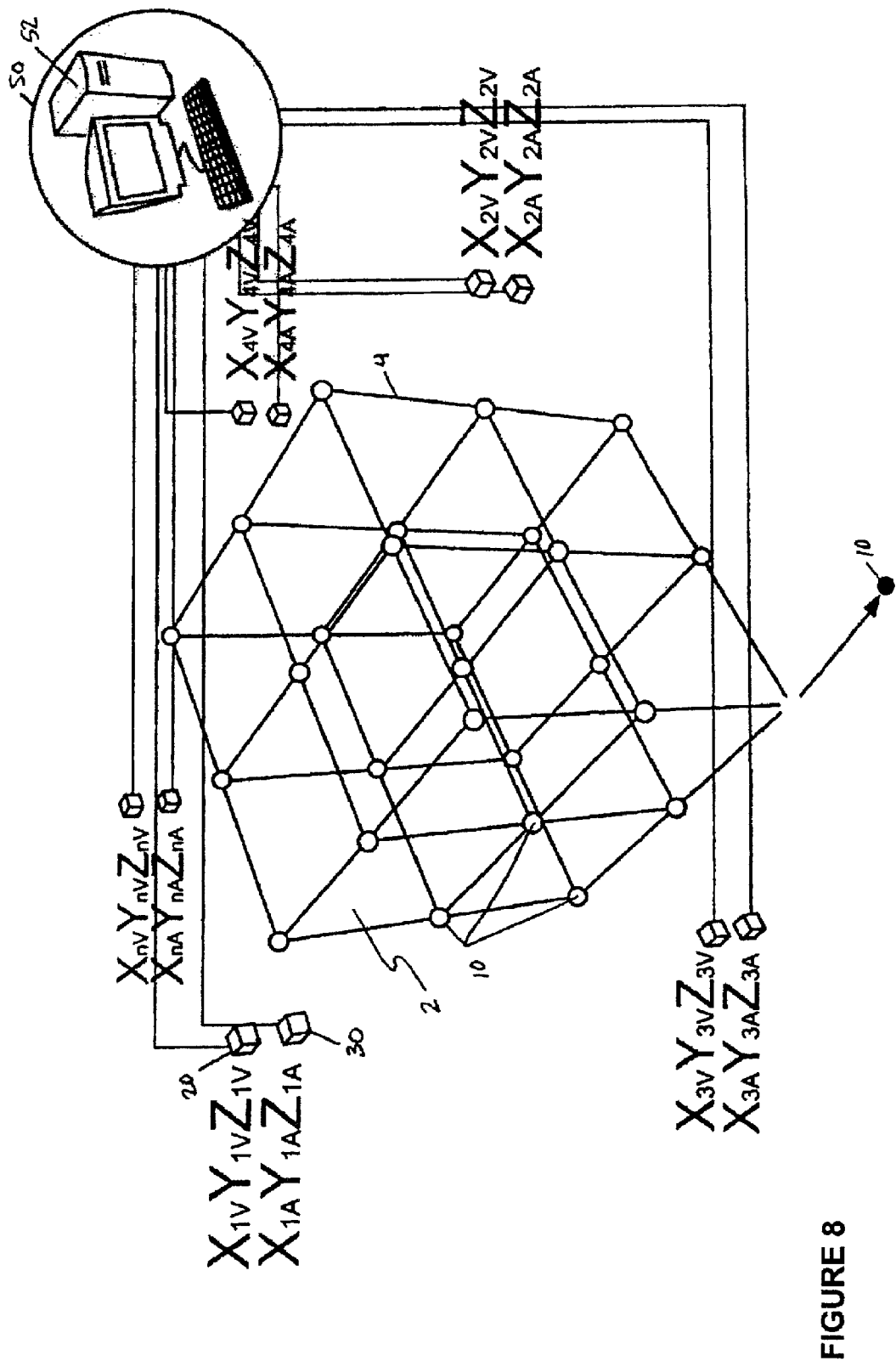
FIG. 8 is a schematic diagram of the subterranean positioning system of FIG. 5 showing initial movement of a UPS element.
Figure 9A:
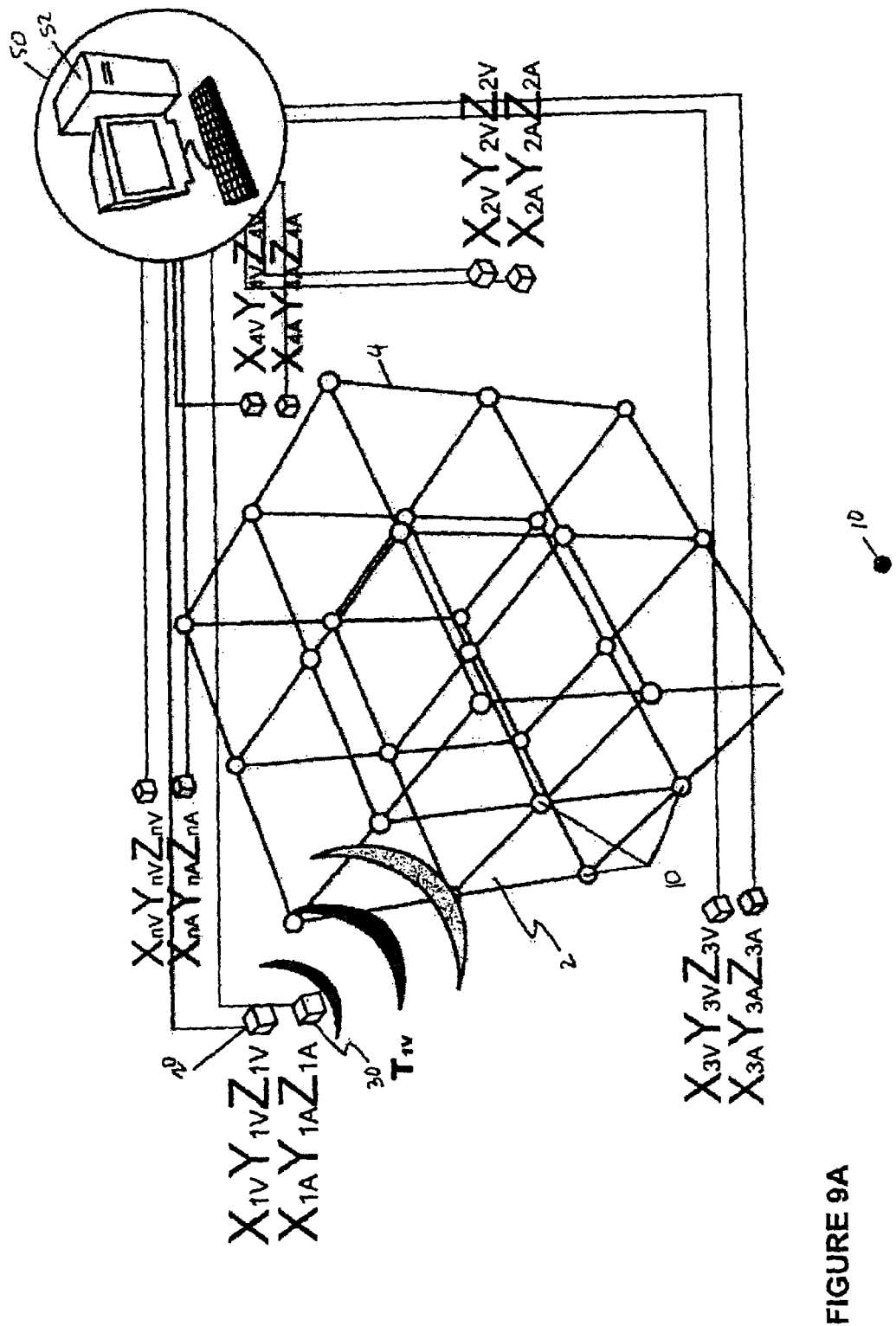
FIGS. 9A to 9E are schematic diagrams of the subterranean positioning system of FIG. 5 showing transmission from the radio frequency antennae to the UPS elements from various positions.
Figure 9B:
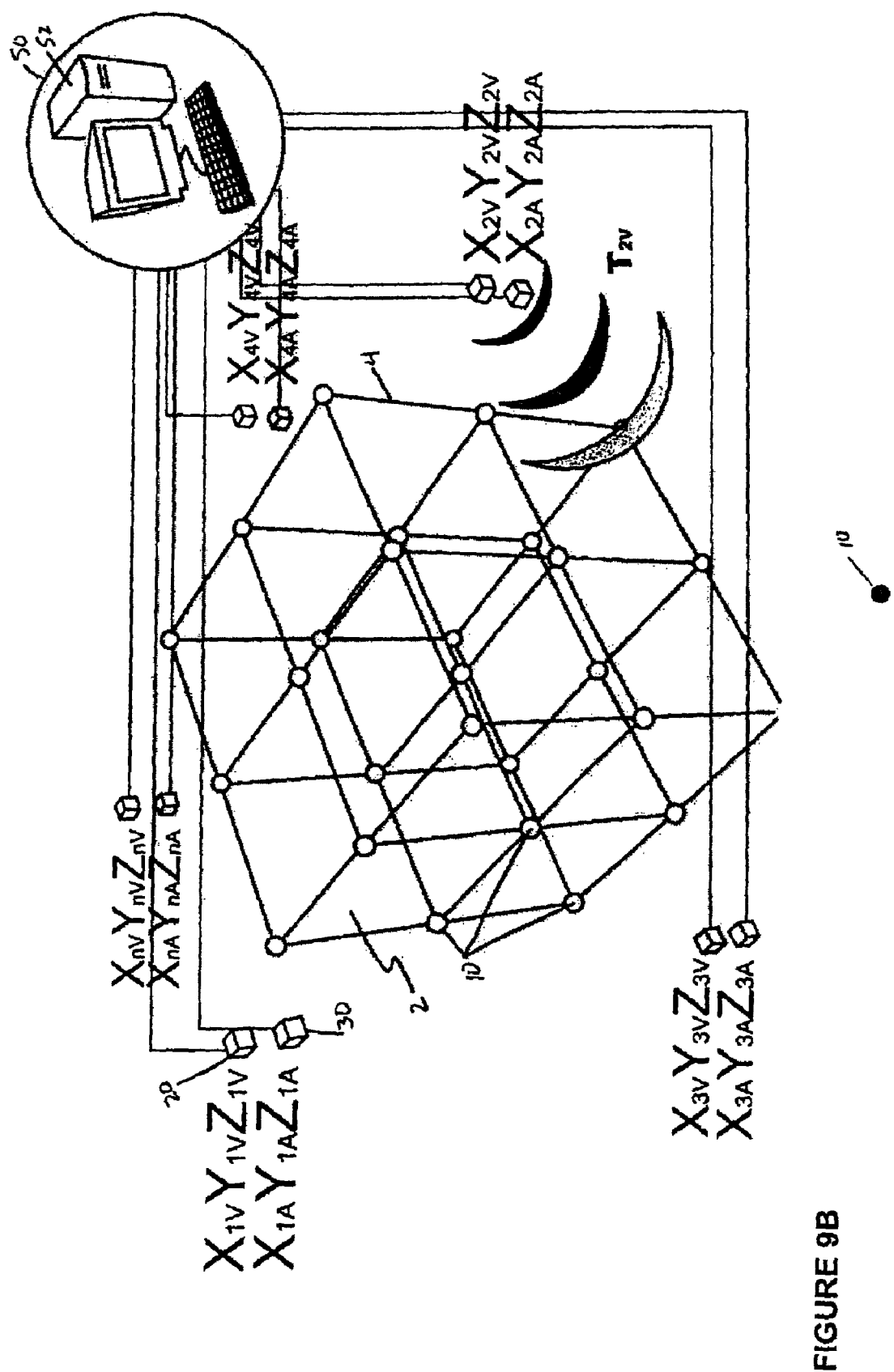
Figure 9C:
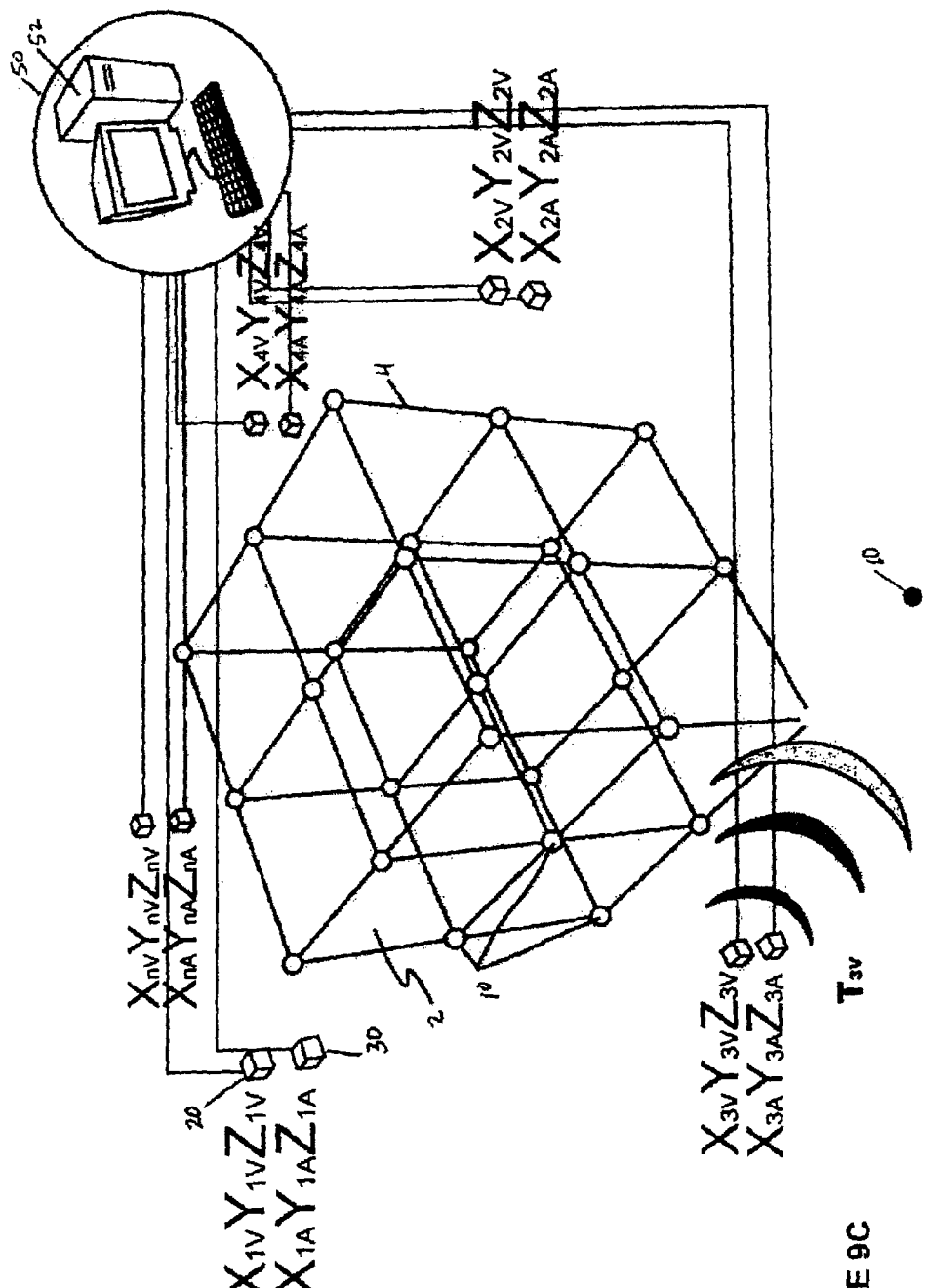
Figure 9D:
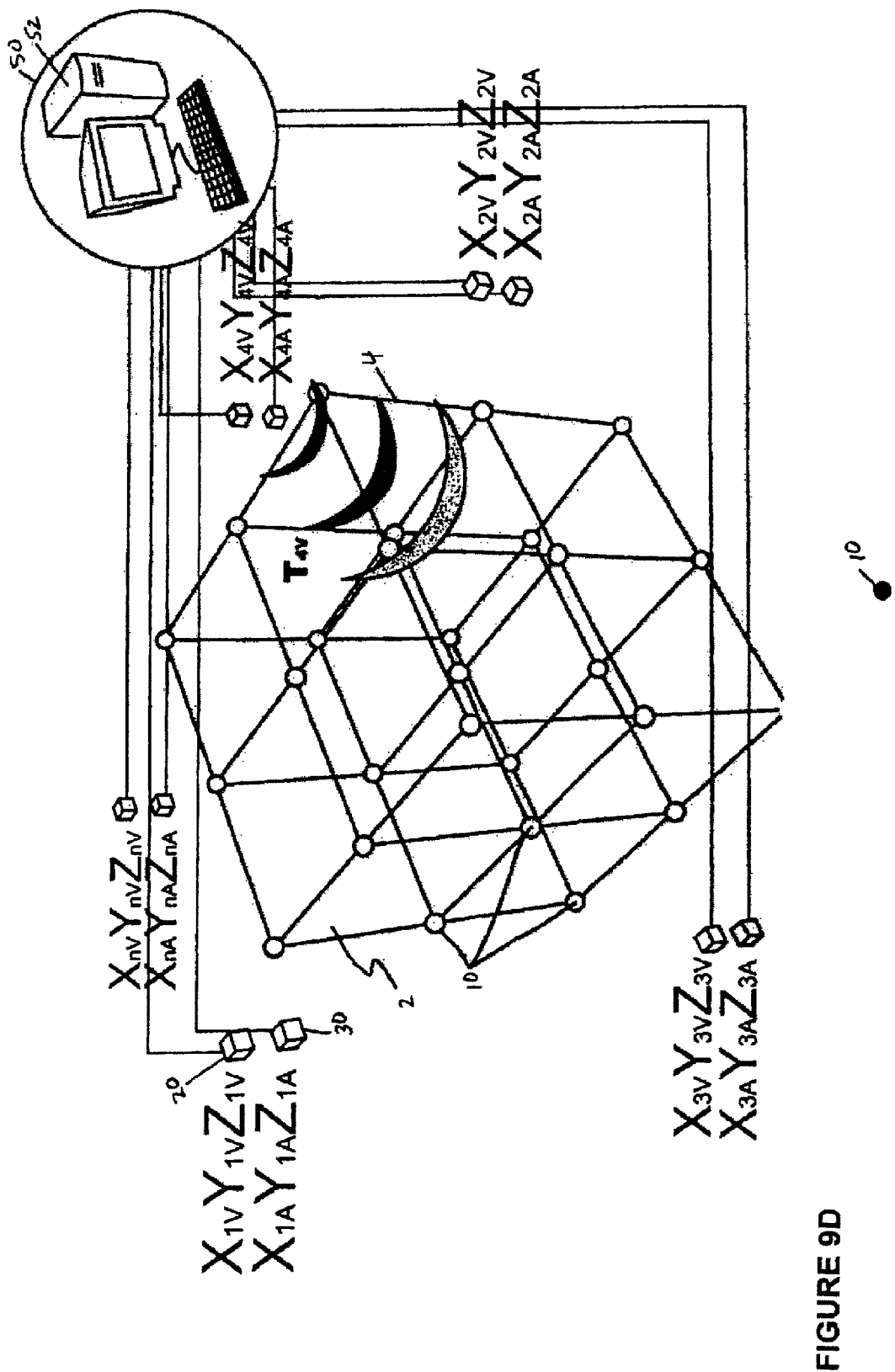
Figure 9E:
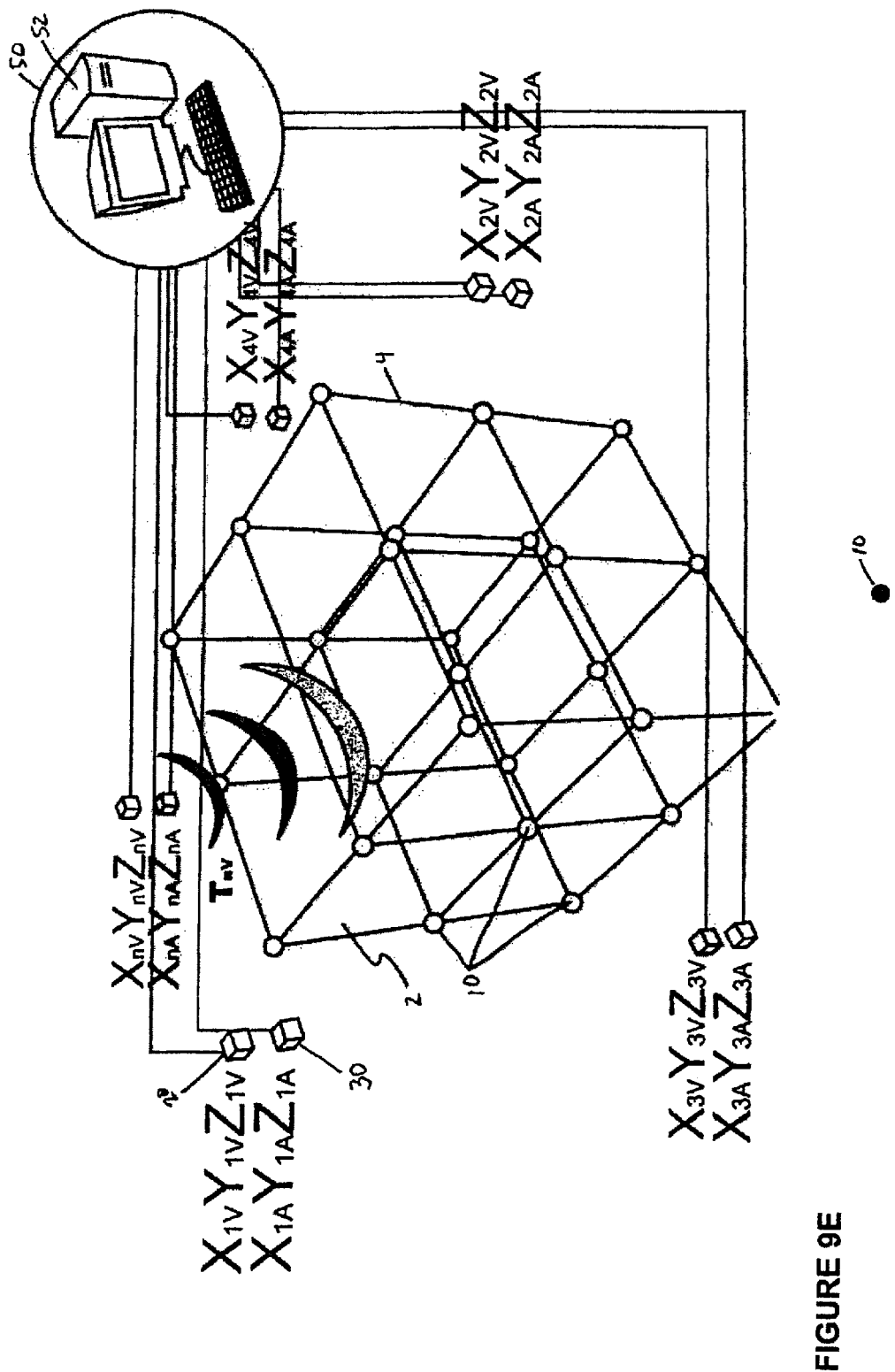
Figure 10A:
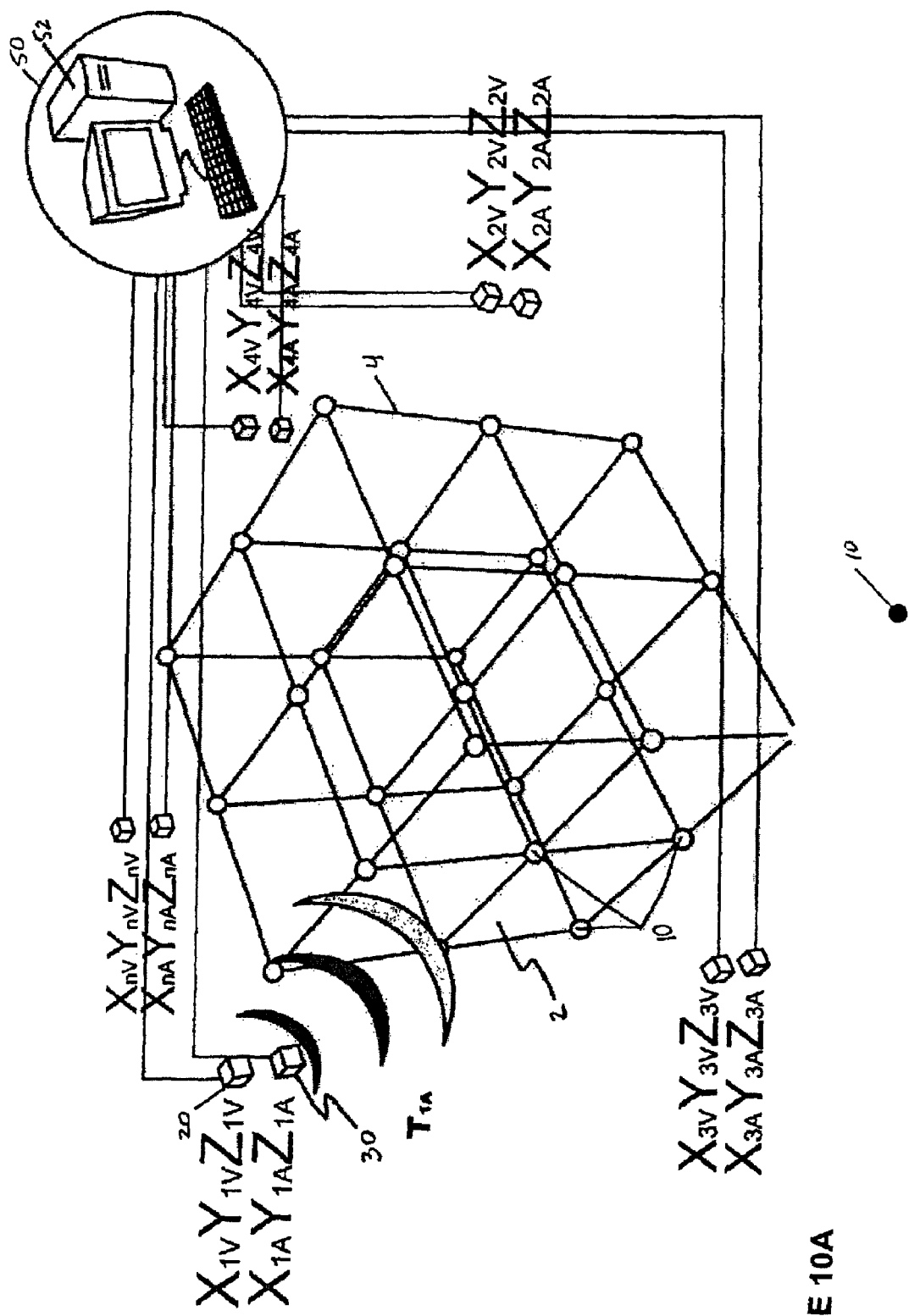
FIGS. 10A to 10C are schematic diagrams of the subterranean positioning system of FIG. 5 showing transmission from the acoustic transmitters to the UPS elements from various positions.
Figure 10B:
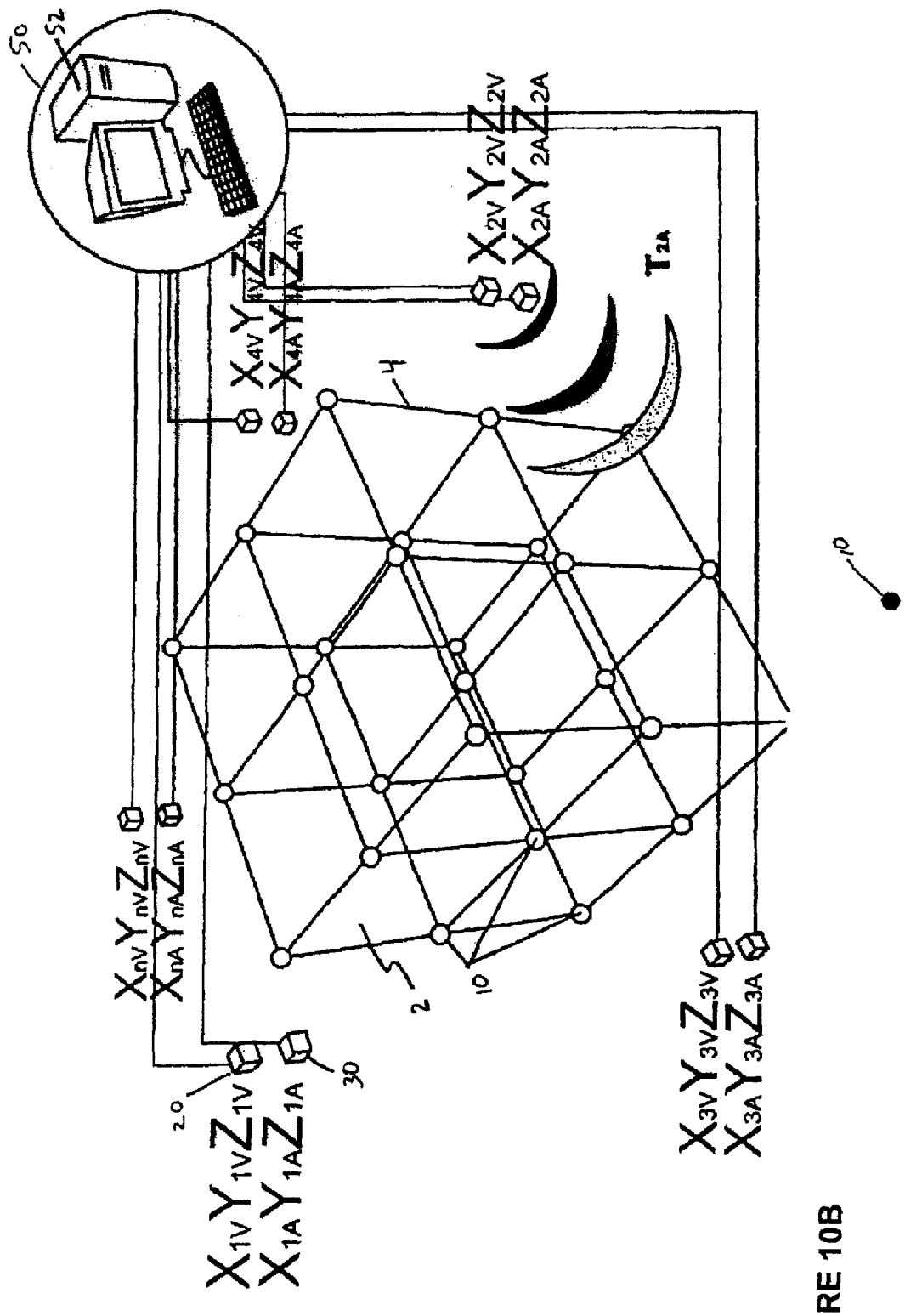
Figure 10C:
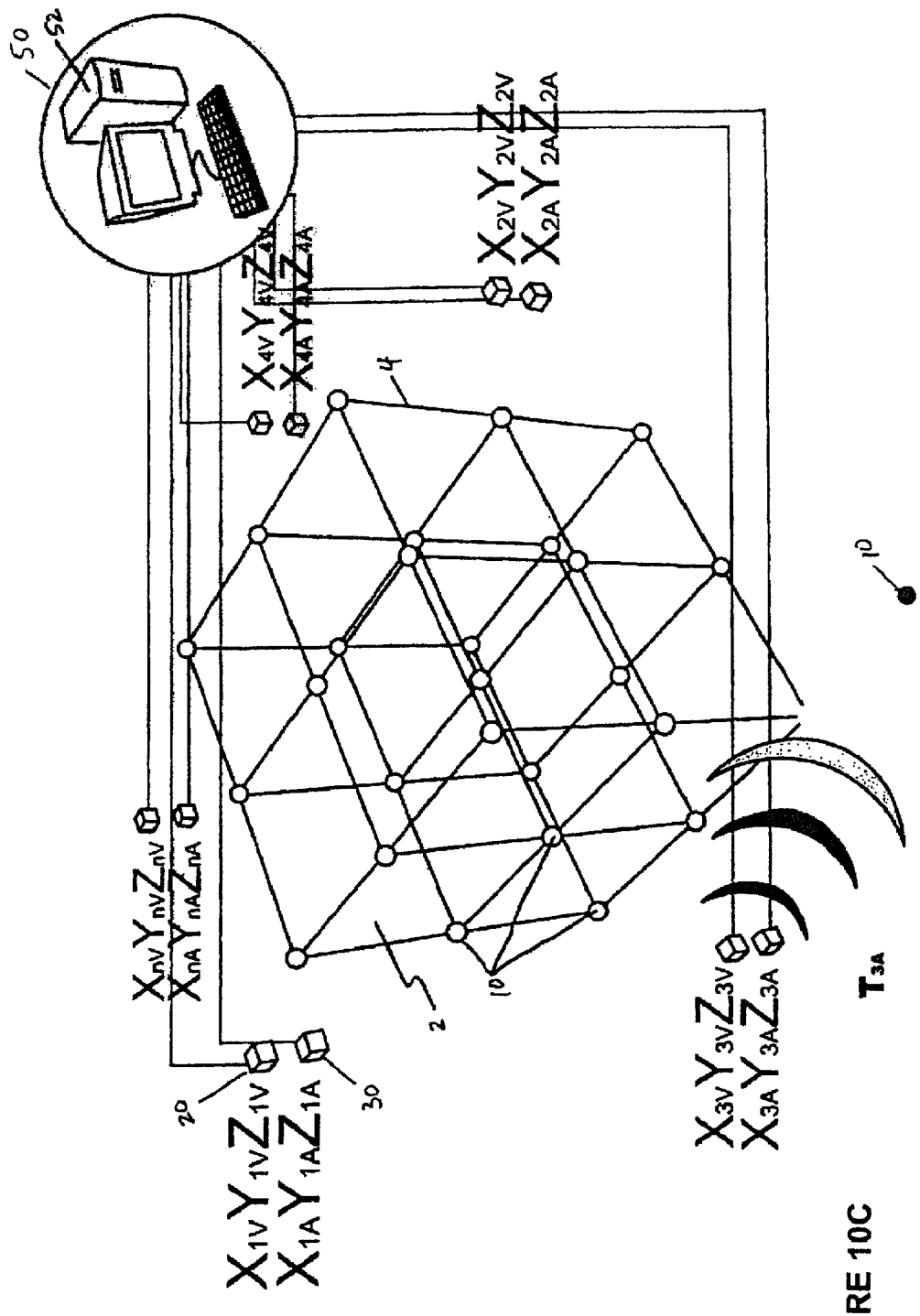
Figure 11:
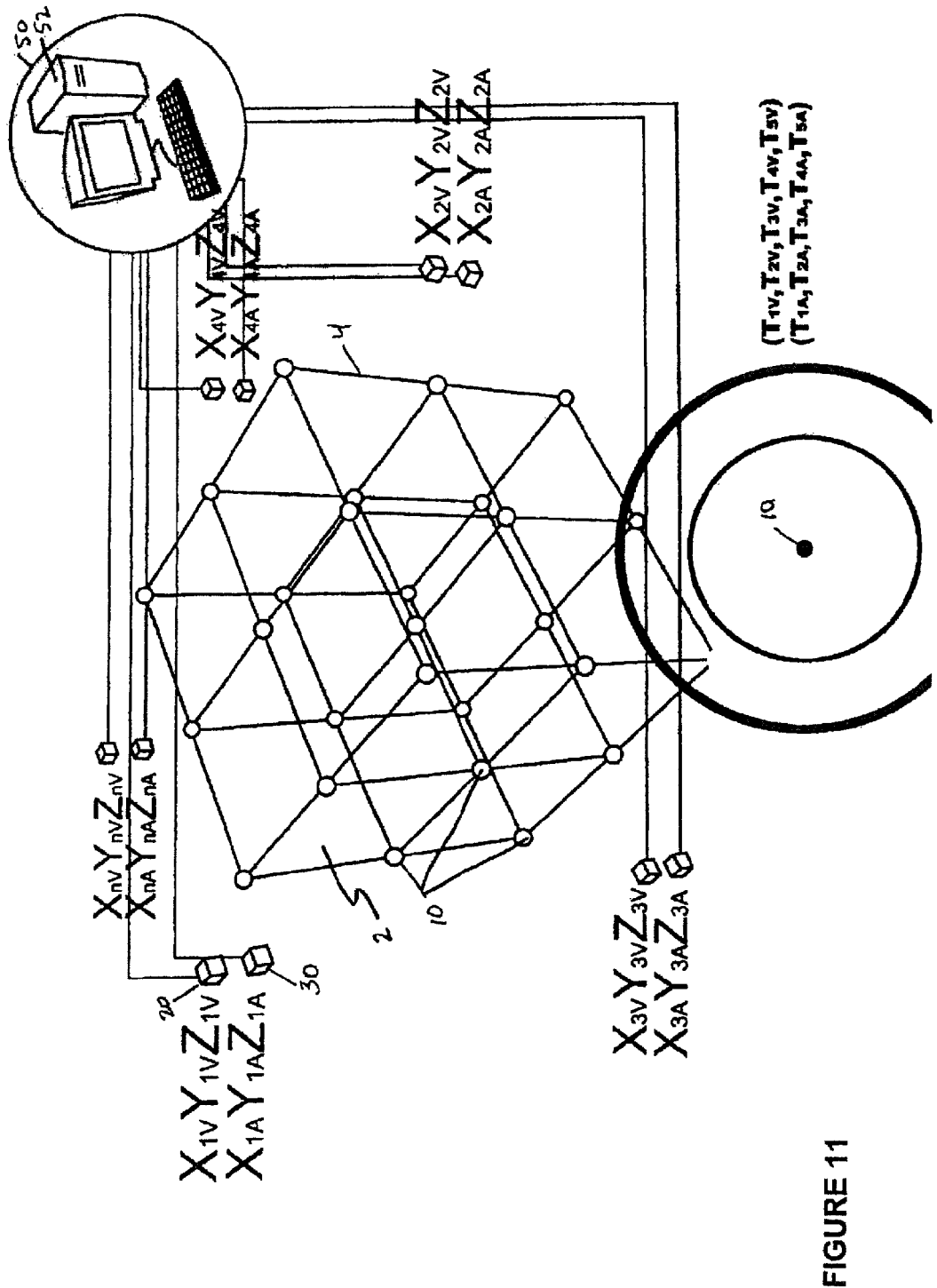
FIG. 11 is a schematic diagram of the subterranean positioning system of FIG. 5 showing transmission from the UPS elements to the radio frequency and acoustic antennae.

Once movement occurs, a motion detector in the UPS element 10 signals the UPS element 10 to come out of 'sleep' mode, and after a preset time interval the UPS element 10 sends out an initial signal via the VLF transmitter 19 to VLF antennas 20 and in turn to the base station 50 indicating that the UPS element 10 has moved to a new location. FIG. 8 conceptually illustrates initial movement of an individual UPS element 10, at the point of a VLF transmission from UPS element 10 to the VLF antennas 20 (as shown in FIG. 11), and from there to the base station 50, to signal initial movement of the UPS element 10. The base station computer 52 processes the VLF data received and commands each acoustic transmitter 30 to send a signal to the UPS elements 10, as shown in FIGS. 9A to 9E, measuring the duration of travel acoustically. The base station computer 52 similarly commands each VLF antenna 20 to send a signal to the UPS elements 10 as shown in FIGS. 10A to 10C, measuring the duration of travel which will be at the speed of light.

In another embodiment of the invention, it is not necessary for the UPS elements 10 to send a signal to indicate initial movement. Instead, the acoustic transmitters 30 send a signal at known intervals, which are received by the UPS elements 10. Similarly, the VLF antennas 20 send a signal at known intervals, which are received by the UPS elements 10.

In this embodiment, once VLF signal transmission, acoustic signal transmission and data collection is complete, the base station 50 will preferably be sent two data sets. The data sets can be used to derive, among other information, the arrival time of the VLF radio waves and the arrival time of the acoustic waves at the UPS elements 10. The VLF data will be more immediate while the acoustic will be slower, but may provide clues as to the rock characteristics from the on-board computer 14 in each UPS element 10 to compare and analyze. FIG. 11 shows the transmission of the VLF/atomic clock and the acoustic information data sets back to the base station 50 for determination of the mathematical solution.

The transmission of the VLF/atomic clock and the acoustic information data sets to the base station 50 can be achieved in various ways. For example, in a preferred embodiment, each UPS element 10 can be equipped with a repeater function, and able to receive and relay data sets from neighbouring UPS elements 10. This relay Matrix can transmit the data sets from one UPS element 10 to another, either randomly or in the general direction of the base station 50, essentially cascading data signals between UPS elements 10, with the UPS element or elements that are closest to the base station 50 finally transmitting the data sets to the base station 50 directly (or a VLF receiver that can subsequently transmit the data sets to the base station). Such a relay matrix would require transmission of signals only over short distances (for example, less than 30 metres between UPS elements) allowing the UPS elements 10 to conserve power.

In another embodiment of the invention, each UPS element 10 transmits the data sets to a VLF antenna 20 to be relayed to the base station 50. In yet another embodiment of the invention, each UPS element 10 transmits the data sets directly to the base station 50.

In some embodiments each transmission (whether acoustic or VLF radio) is preferably time-stamped with the instantaneous time setting of the atomic clock 18 of the transmitting component at the moment of transmission, and associated with the instantaneous time setting of the atomic clock 18 of the receiving component at the moment of reception. With this information the base station computer 52 thus calculates, for each acoustic signal emitted by the various acoustic transmitters 30, the time of flight (time elapsed between transmission from the acoustic transmitter 30 and reception by the UPS element 10); and for each VLF radio signal the time of flight (time elapsed between transmission of the signal from the various VLF antennas 20 and reception of the VLF radio signal by each UPS element 10). Through triangulation of each data set, an accurate assessment of instantaneous UPS element 10 positions over a desired time interval, and thus of rock movement and location, can be made. The accuracy of path description is a function of the number of acoustic transmitters 30 and VLF antennas 20 used. With each additional acoustic transmitters 30 or VLF antenna 20 used, a better determination of actual movement can be calculated.

It will be appreciated that the monitoring system and method of the invention can be accomplished using only one type of transmission. However, the additional information provided by using two different transmission types, in the described embodiment for example acoustic and VLF radio transmissions, can significantly improve the accuracy of the data analysis.

The VLF radio communication travels at much higher speed than the acoustic signals through the rock. The result of this is a higher degree of accuracy for the embodiment of the invention utilizing VLF radio as an atomic clock 18 is used for time stamping transmission and reception times. This is referred to as "tight data," while the acoustic data is referred to as "loose data," which does not require the same degree of precision time-stamping. For each iteration of the method of the invention, there will be a difference between the position estimated by the loose data and the tight data, which is analyzed to describe the quality of rock between each transmission source located outside the ore body. A larger error (difference between duration of travel) indicates that the rock is more fragmented and less competent. The speed of VLF radio frequency signal travel is much greater through the rock than acoustic signal travel and therefore a greater degree of error is expected from the acoustic signals. This larger error, compared with the lower error of the VLF system, provides a richer sensing system. This in turn provides a more detailed view of the cave front.

The result is a conceptual picture of what the caving front composition might look like at the time of analysis. The process is repeated at intervals, preferably daily or weekly for instance, for use in describing the behaviour of an ore body in this mining method.

Figure 12:
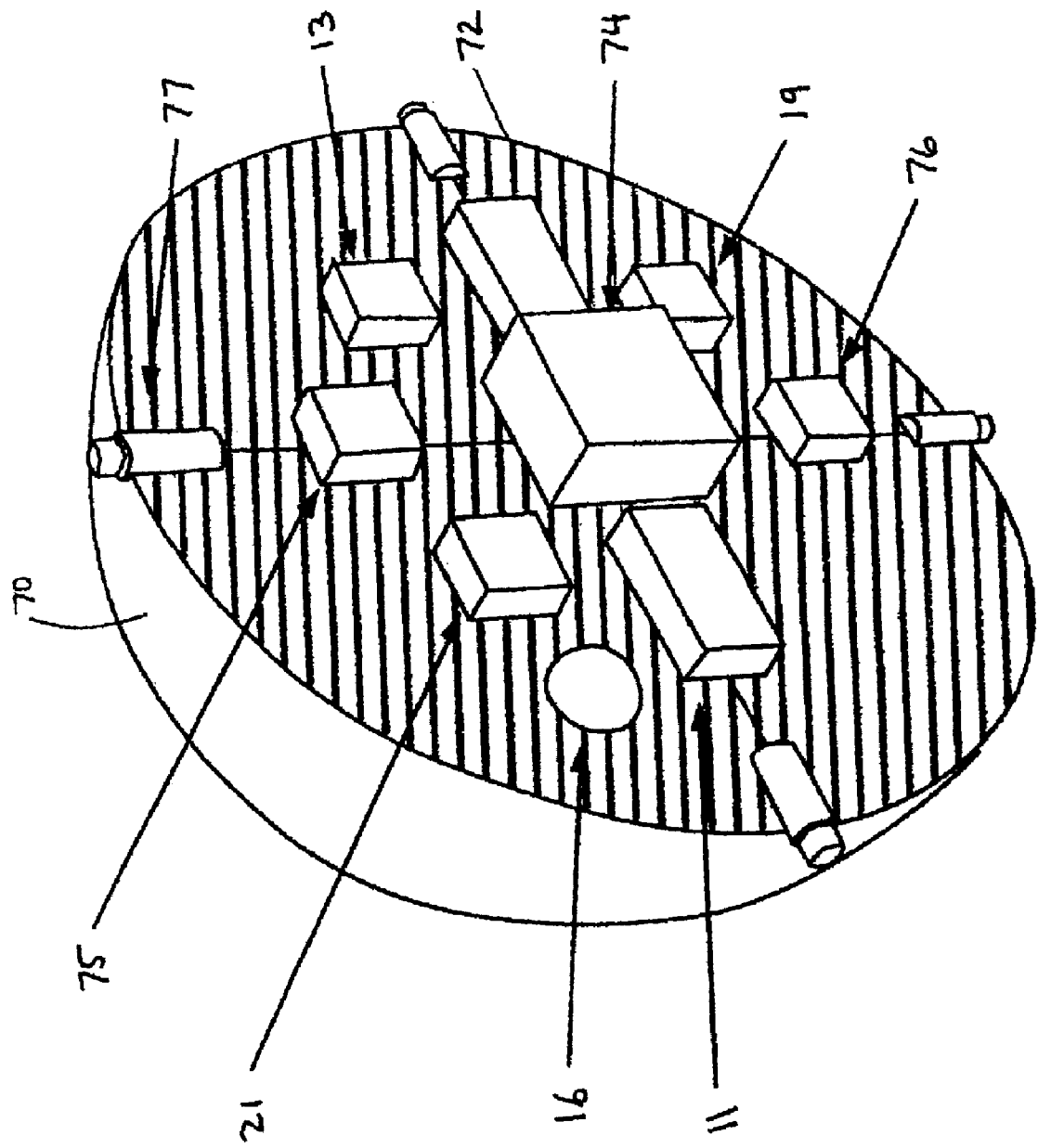
FIG. 12 is a schematic diagram of a further embodiment of a UPS element without an atomic clock.

Another embodiment of the invention uses only acoustic-based devices for positioning purposes. FIG. 12 illustrates a schematic of the UPS element 70 of this embodiment, which comprises a combination of external acoustic transmitters 30 for positioning and VLF antennas 20 for communication of time of flight information to the base station computer 52 for triangulation. In this embodiment, the UPS elements 70 may have all the same internal components as the UPS elements 10 of the previously-described embodiment, except that an atomic clock is not required in the UPS elements 70 in this embodiment and instead the relative time of reception by the various VLF antennae (which can still provide timing information) and acoustic receivers is used for triangulation calculations to determine instantaneous positions of the UPS elements 70.

Figure 13:
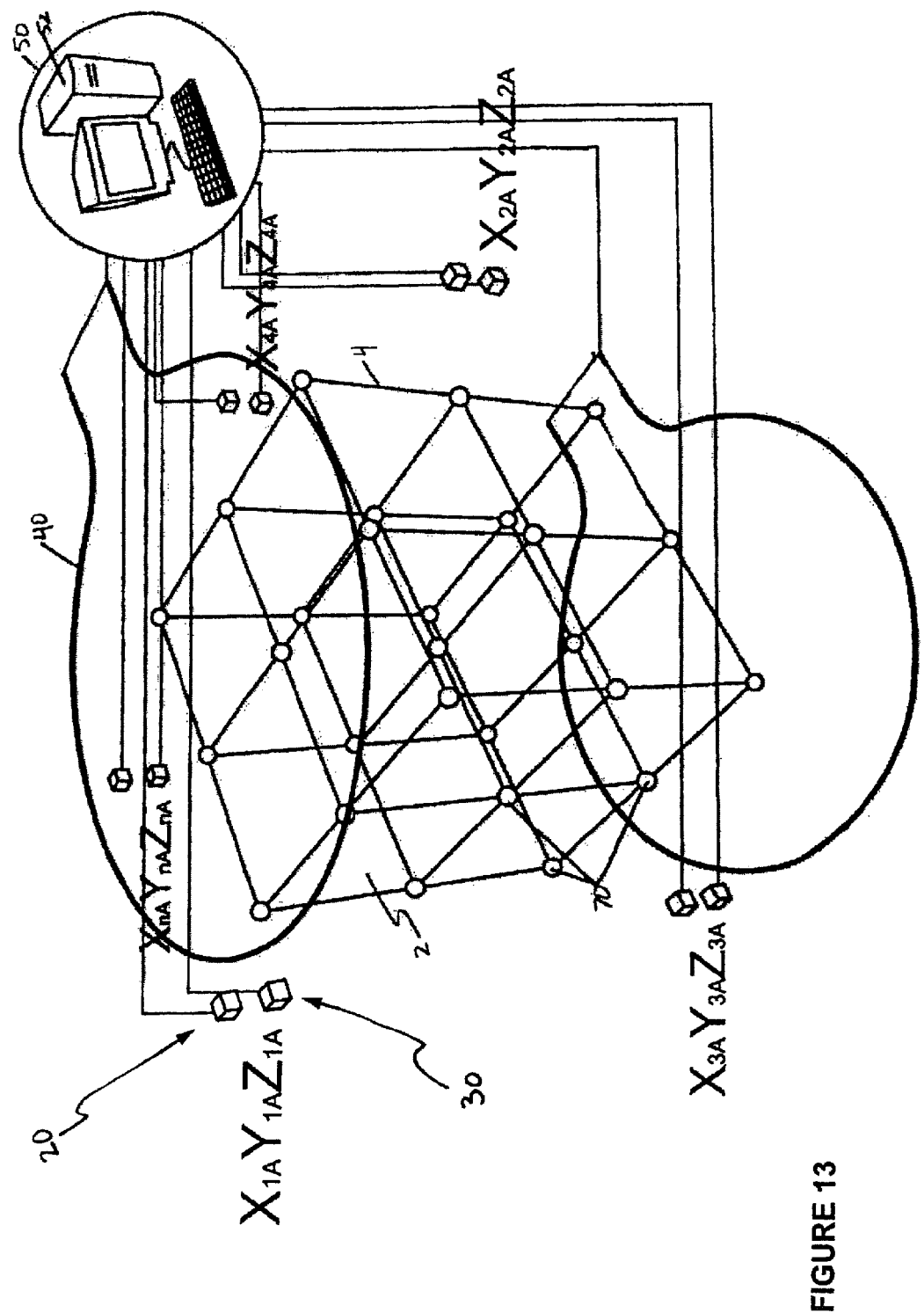
FIG. 13 is a schematic diagram of a further embodiment of the subterranean positioning system showing an embodiment of the antennae with radio frequencies that are medium penetrating.
Figure 14A:
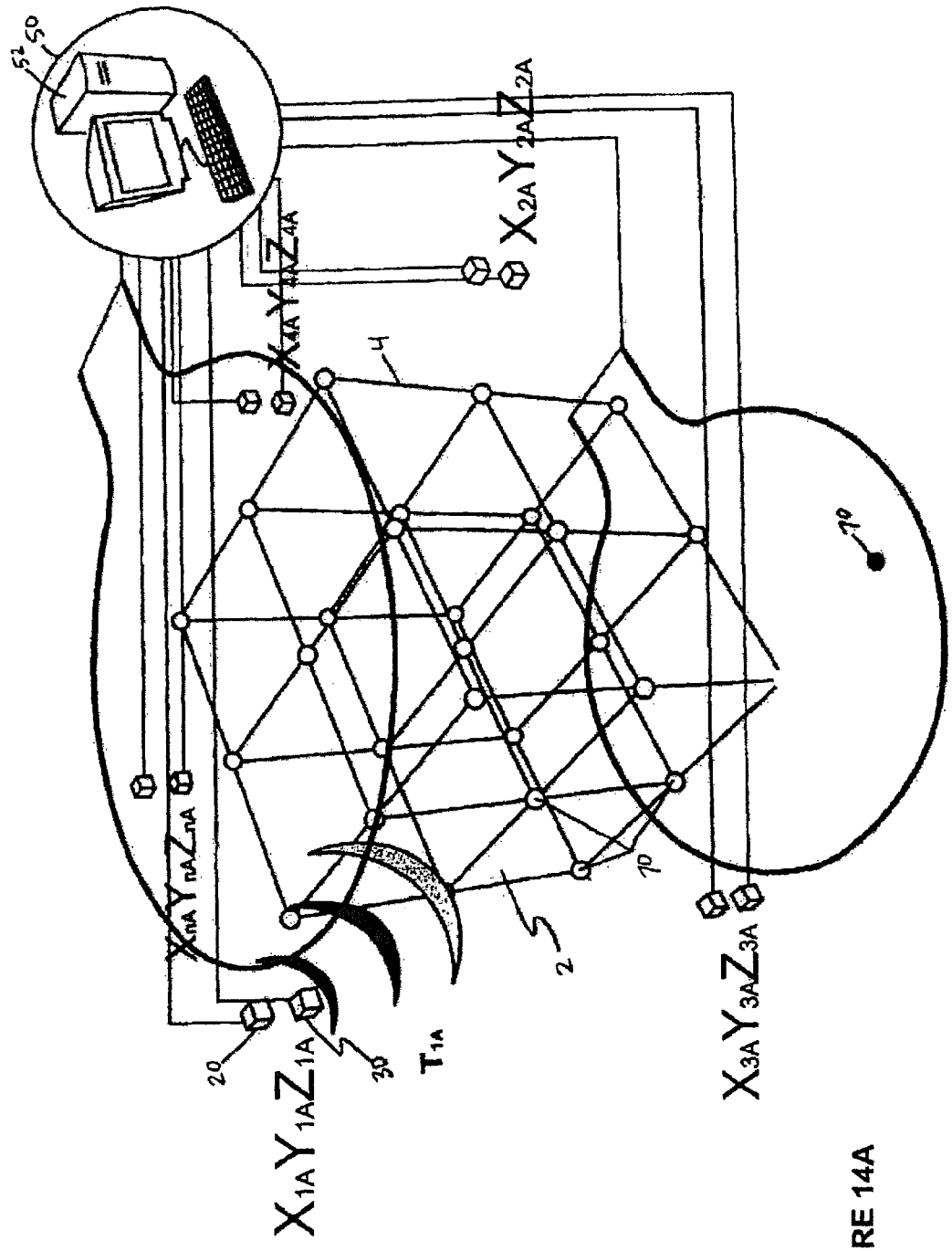
FIGS. 14A to 14E are schematic diagrams of the subterranean positioning system of FIG. 13 showing transmission from the acoustic transmitters to the UPS elements from various positions.
Figure 14B:
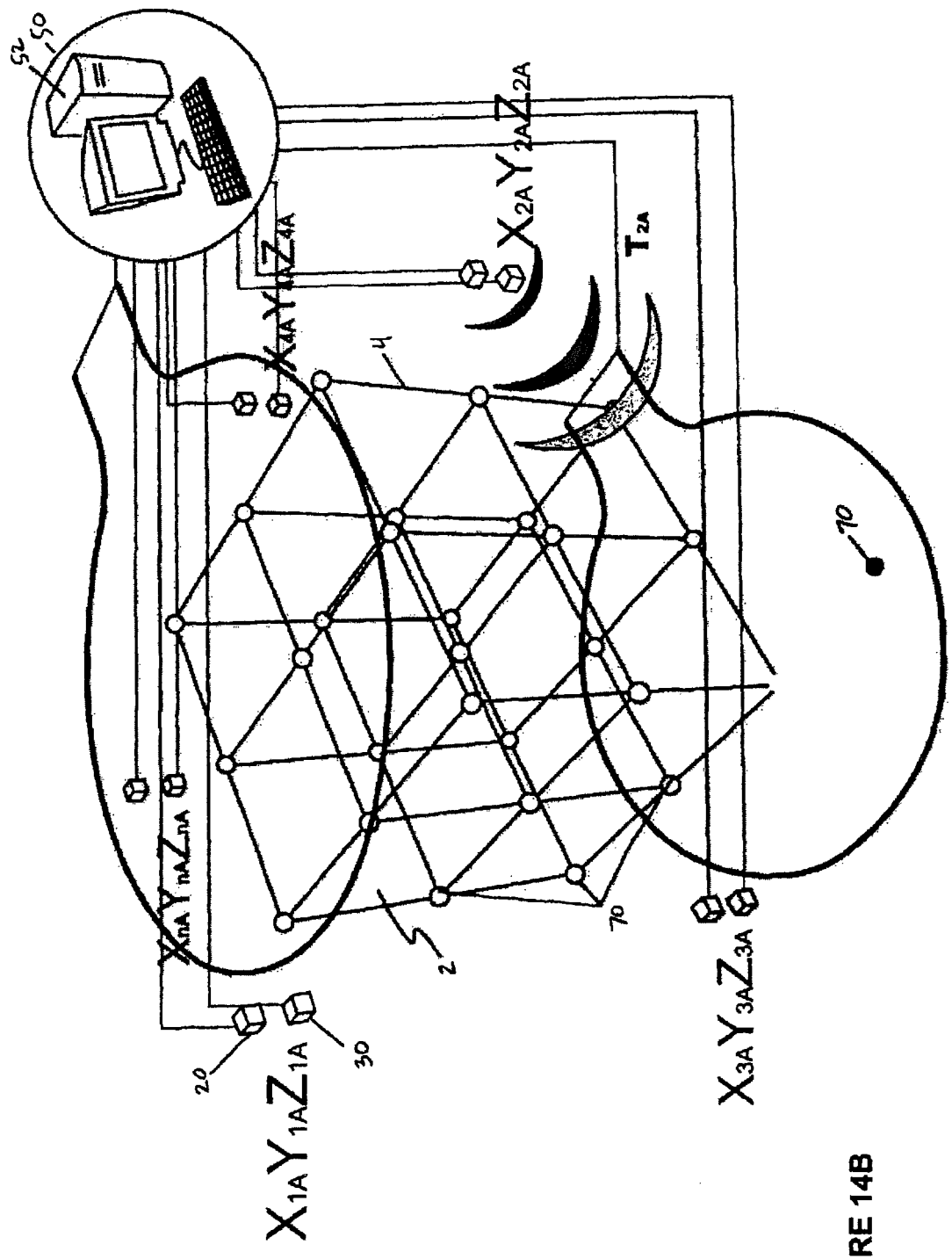
Figure 14C:
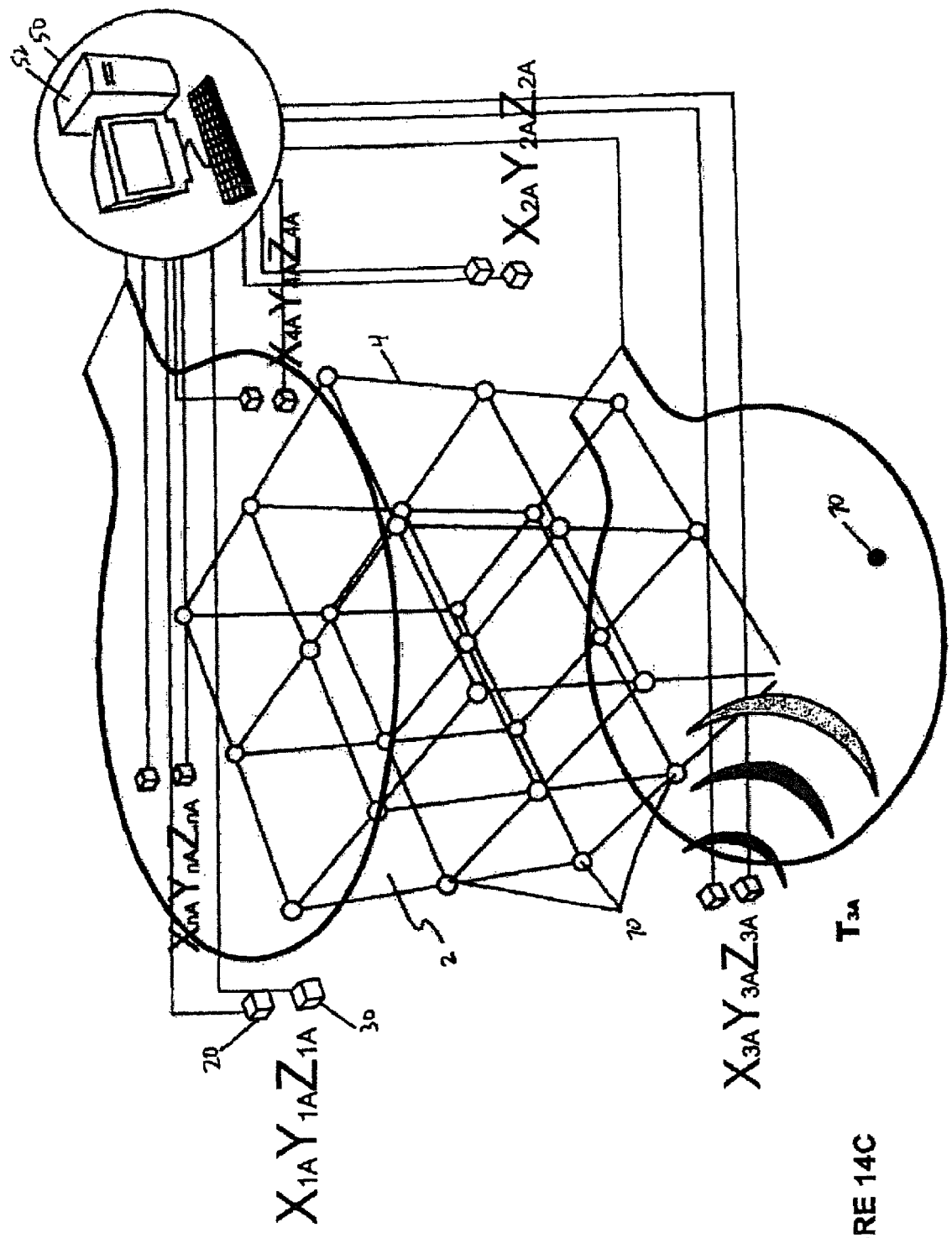
Figure 14D:
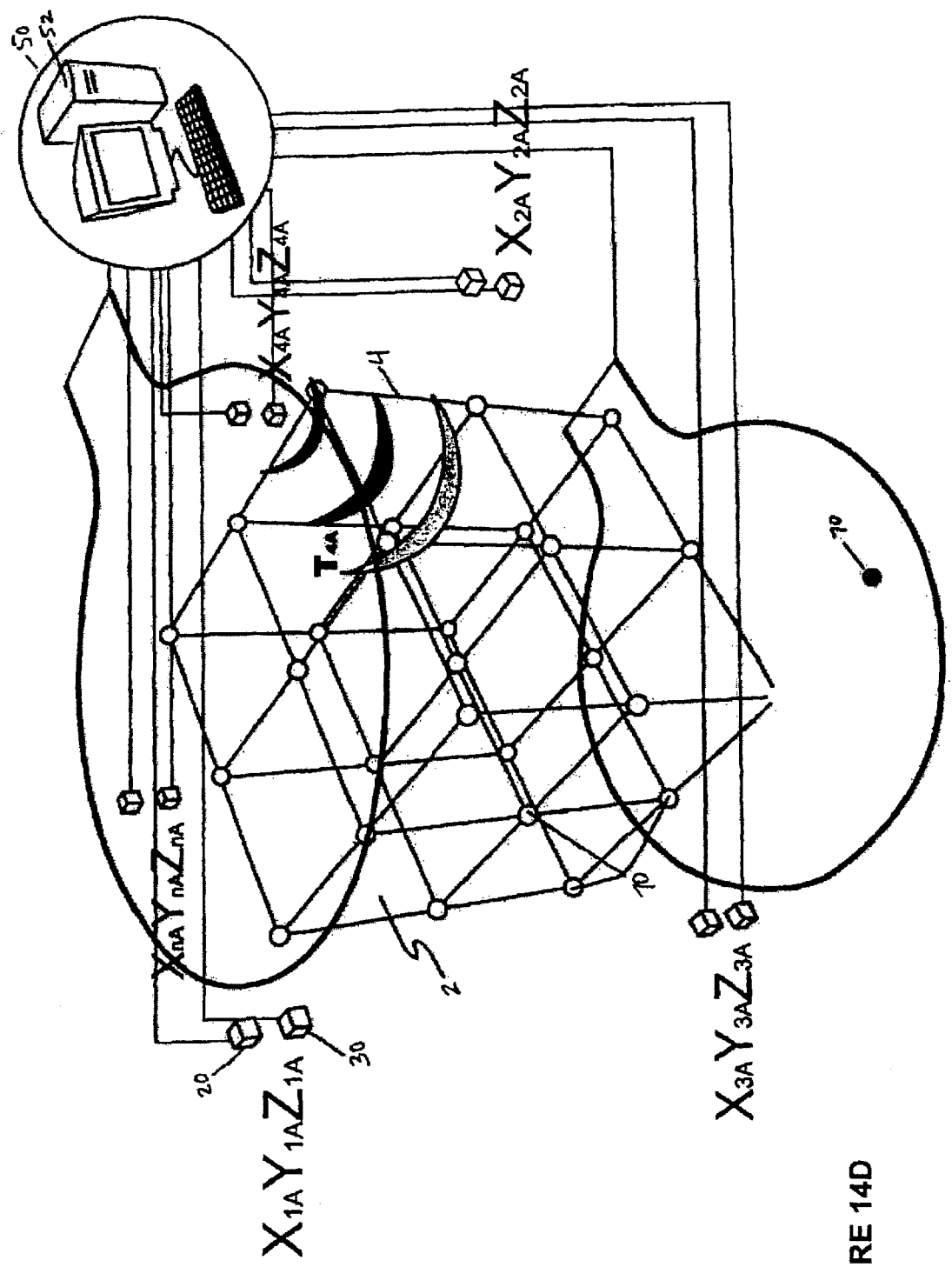
Figure 14E:
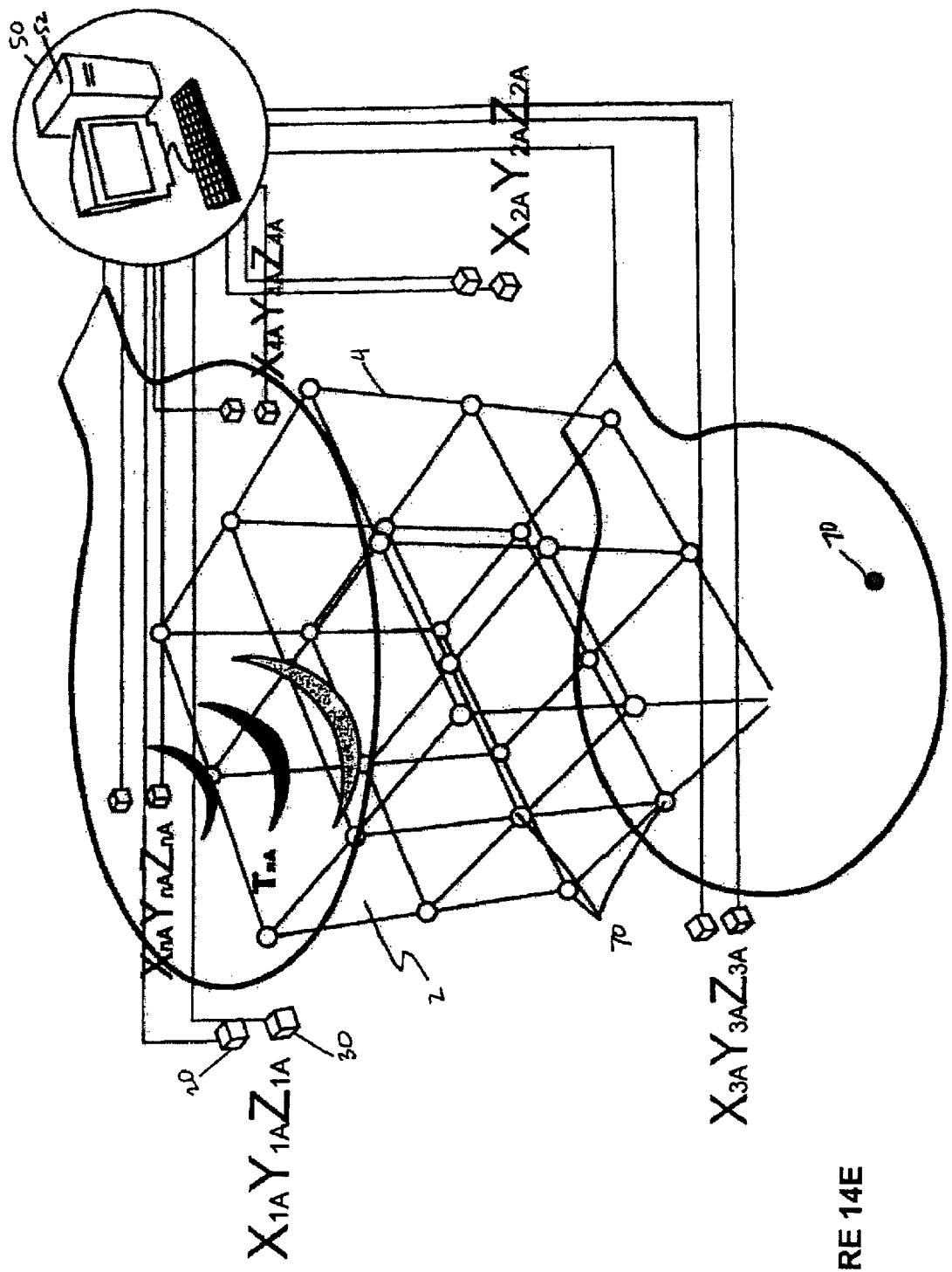

In this embodiment, it is possible to use either the VLF antennas 20 as in the preferred embodiment or a VLF loop antenna 40, more preferably two VLF loop antennas 40. The use of VLF loop antennas 40 provides for a large coverage area for VLF signal transmitting and receiving. FIG. 13 shows the initial setup of the VLF loop antennas 40. One is located at the surface and one below monitored region. The antenna located below the monitored region may be positioned in mine tunnels, for example.

In another embodiment of the invention, instead of VLF loop antennas 40, VLF ferrite core antennae can be used. When a VLF loop antenna 40 is wrapped around a ferrite core, instead of as a continuous loop, this enables transmission of a VLF radio signal from a known point since each VLF ferrite core antenna can be placed in a Predetermined position. The UPS elements 70 are inserted in a drilling grid formation as in the embodiment described above.

As a UPS element 70 begins to move, a motion detector (or triaxial gyro 13) 73 inside the UPS element 70 casing 72 is activated. Triaxial inclinometers 75, accelerometers 76, and strain gauges 77 collect the data from the movement and store it in the memory of the UPS element 70 on-board computer 74 for transmission via the VLF antennae 20 to the base station 50 for input into the mathematical equations for resolving. Although for each of these features multiple components are provided for redundancy, it will be appreciated that only one of each component is needed to accomplish its respective function.

While the on-board sensing information is being collected, the motion detector 73 sends a signal to the on-board computer 74 indicating movement. A signal is then relayed via the VLF antennae 20 to the base station 50. The base station computer 52 processes the VLF data received and commands each acoustic transmitter 30 to send the signal to each UPS element 70 to begin acoustic location of the UPS element 70. The motion detector 73 and short term storage in the on-board computer 74 reduce the amount of time the computers and sensors are powered, allowing for a 'sleep' mode when the UPS element 70 is motionless for a selected time period, which in turn reduces power consumption and increases the length of time the UPS element 70 is available for data collection.

FIG. 14A to 14E illustrate measurement of the duration of travel for each signal from the base station 50 to the UPS element 70. Using a matrix calculation for 'n' number of signals the location of the UPS element 70 is determined. For accuracy verification, different combinations of signal data are used and averaged for a more reliable estimate.

Figure 15:
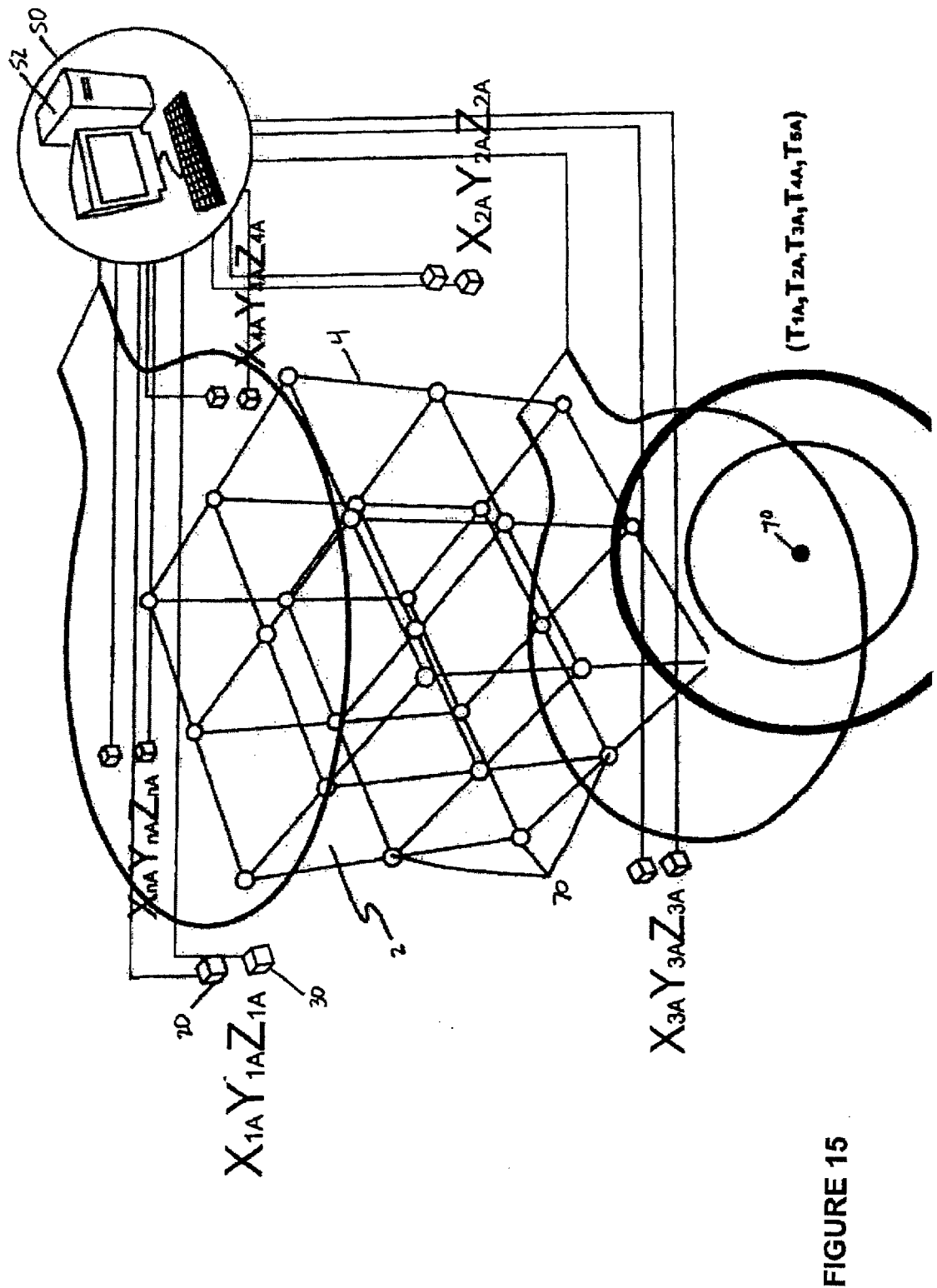
FIG. 15 is a schematic diagram of the subterranean positioning system of FIG. 13 showing transmission from the UPS elements to the antennae with radio frequencies that are medium penetrating.

FIG. 15 illustrates the UPS element 70 transmission times back to base station 50 for triangulation. To complete the locating process, a signal containing all data stored in each UPS element 70 is transmitted to the base station computer 52 for calculation, data analysis, and if desired, visual representation. This embodiment can utilize acoustic transmission technologies similar to those currently used for VLF voice communication and microseismic systems. The transmission capability is variable depending on the rock types and location resolution.

Figure 16:
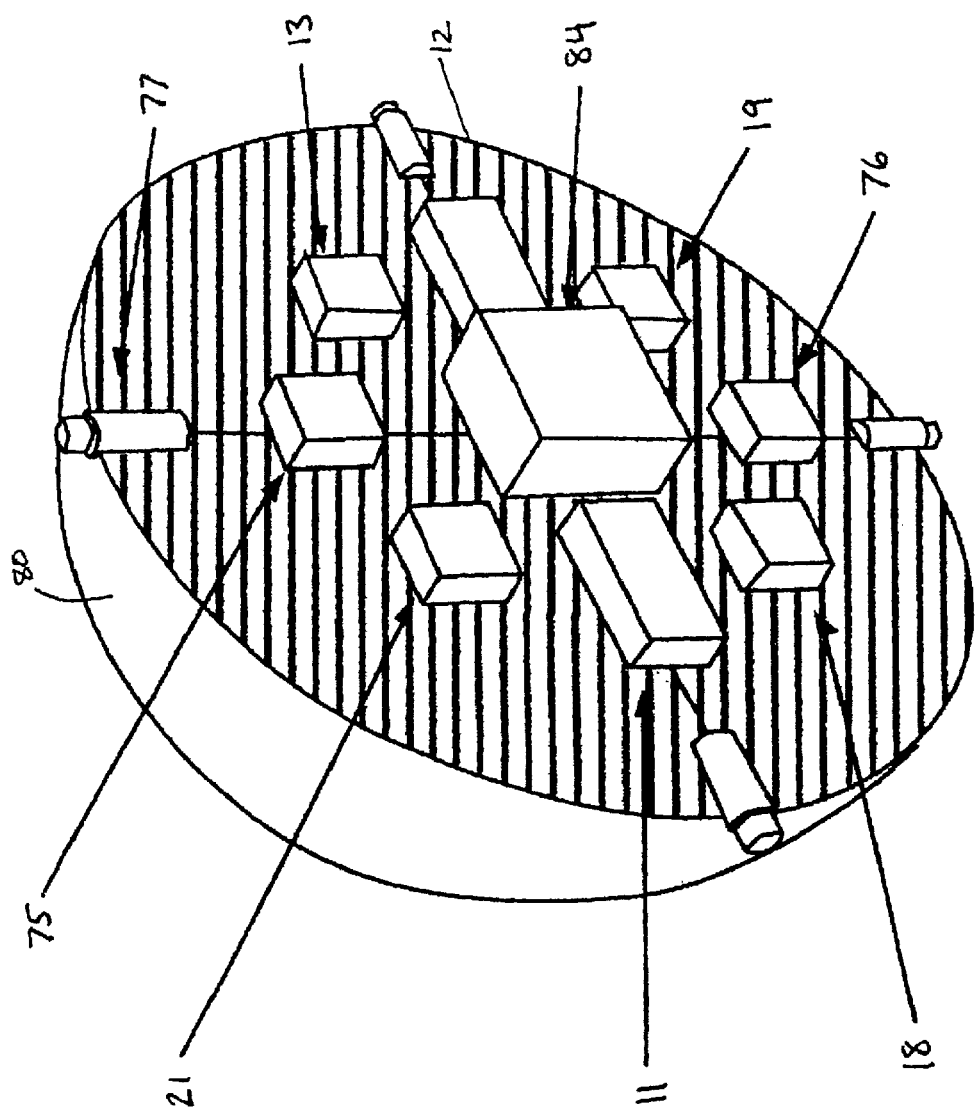
FIG. 16 is a schematic diagram of a further embodiment of a UPS element without a microphone.

Another embodiment of the invention uses an atomic clock 18 within each UPS element 80, but does not use acoustic signals, so there is no microphone necessary in each UPS element 80. FIG. 16 illustrates a schematic of the UPS element 80 of this embodiment.

As movement of the UPS elements 80 of this embodiment begins, motion detectors awaken the UPS element 80 and the system goes online. The triaxial clinometers and accelerometers collect the data from the rock movement. The UPS element 80 sends out a signal to the base station 50 that it has moved location.

As the triangulation process begins, all atomic clocks 18 must first be synchronized to ensure exact accuracy. Less expensive high accuracy clocks may be sufficient instead of atomic clocks 18. As the UPS elements 80 transmit time of travel via each VLF antennas 20 to the base station 50 for calculation of the UPS element 80 position. Once all the signals have been received by the UPS element 80 from the VLF antennas 20 and stored within each onboard computer, a signal containing the collected data is propagated to the base station computer 52 where calculations are performed.

The base station computer 52 calculates the time elapsed for each signal to reach the UPS element 80. Through triangulation, an accurate picture of UPS element 80 movement and location is obtained. The accuracy of path description and underground GPS system is a function of the number of VLF antennae 20 used. With each additional VLF antenna 20, a better picture of actual movement is calculated.

This concept has the advantage of being very accurate due to the transmission being at the speed of light combined with atomic clocks 18. It is also robust and has improved survivability. The cost associated with developing the initial system is high, however, over the long term this system may be less costly.

A further embodiment of the invention may use gyroscope-based UPS elements (not shown). In this embodiment, the UPS elements do not need a microphone or atomic clock. Communication to and from the UPS elements 10 is via a VLF radio network with a large loop antenna, preferably two large loop antennas 40. For this embodiment, VLF ferrite core antennas are not necessary.

The initial system configuration of the UPS elements 10 for this embodiment of the invention is similar to the first embodiment. As each UPS element 10 moves and translates spatially, the internal sensing system of the UPS element 10 begins to work. The accelerometers sense movement and the triaxial gyroscopes keep track of small displacements and rotations. This information provides individual UPS element x,y,z coordinate data. This information is stored in the on-board computer 14 ready for transmission via the VLF radio network.

As in the previous embodiments, once the UPS element 10 begins to move, it transmits its location to the loop antennas 40 and ultimately the base station 50 for display. Since each UPS element 10 has a VLF transmission system, on-board information, can be transmitted from the UPS element 10 to the VLF loop antennas 10. This system is a one-way system to download data, which occurs at low speeds, specifically in the order of a few baud. A sequence of slow speed communications occurs to download the position data from the UPS elements 10 to the base station computer 52 for display. In this embodiment, the mathematical calculations discussed above are not necessary since the instrumentation is on-board each UPS element 10, so the location is determined directly by the on-board sensing system.

As the cave proceeds, several UPS elements 10 move at once. In this embodiment, each UPS element transmits its data at random times to reduce collisions and resulting information loss. This allows all the data to be transmitted slowly, which is necessary as VLF is a very low capacity system. However, the movement within the rock body is expected to be slow, so a slow rate of data transmission is not problematic.

Even the best gyros drift approximately one degree per hour. To compensate for gyroscope drift, a re-reference may be required for this method to work effectively. The advantages of this embodiment are minimum hardware requirements and a straight forward workable communication system.

Various embodiments of the present invention having been thus described in detail by way of example, it will be apparent to those skilled in the art that variations and modifications may be made without departing from the invention.

I claim:

1. A system for monitoring motion in a subsurface environment, comprising:
    at least first, second and third antennas for transmitting electromagnetic radiation (emr) signals from which time of flight data can be derived, each coupled to at least one signal transmitter, the first antenna for transmitting first antenna signals associated with the first antenna, the second antenna for transmitting second antenna signals associated with the second antenna, and the third antenna for transmitting third antenna signals associated with the third antenna;
    a plurality of underground positioning system (UPS) elements disposed in spaced relation within the subsurface environment, each UPS element comprising
        at least one UPS transmitter for transmitting an emr UPS signal comprising at least an identifier associating the UPS signal with the transmitting UPS element and data relating to signals received from the at least first, second and third antennas; and
        at least one UPS receiver for receiving the first antenna signals from the first antenna, the second antenna signals from the second antenna and the third antenna signals from the third antenna; and
    a base station antenna coupled to a base receiver and positioned for receiving the UPS signals and transmitting the UPS signals, or signals corresponding to the UPS signals, to a data processing device;
    whereby as at least one of the UPS elements moves, the data processing device derives from the UPS signals a direction of movement of the at least one moving UPS element or a rate of movement of the at least one moving UPS element, or both.

2. The system of claim 1 wherein time of flight data is derived at least in part from data provided to the at least first, second and third antennas by an atomic clock.

3. The system of claim 2 wherein the at least one UPS transmitter is capable of retransmitting at least one UPS signal received from others of the plurality of UPS elements, and the UPS receiver is capable of receiving UPS signals from others of the plurality of UPS elements for retransmission, and the base station antenna receives the UPS signals from at least one UPS element.

4. The system of claim 2 wherein each of the first, second and third antennas sequentially transmits a series of signal bursts, and time of flight data is derived at least in part from data identifying a phase shift between successive transmissions.

5. The system of claim 2 wherein the subsurface environment comprises a fluid material and the UPS elements are suspended in the fluid material.

6. The system of claim 2 wherein the UPS elements are affixed to persons or mobile assets.

7. A position monitoring system for monitoring motion in a subsurface environment, comprising:
    a plurality of underground positioning system (UPS) elements for suspending within the subsurface environment, each UPS element comprising at least a signal transmitter for transmitting a characteristic emr signal having an identifier for associating the signal with the transmitting UPS element;
    a first antenna coupled to a first signal receiver and positioned for receiving the characteristic signals from the UPS elements and transmitting the characteristic signals, or signals corresponding to the characteristic signals, to a data processing apparatus; and
    at least a second antenna coupled to the first signal receiver or another signal receiver and positioned for receiving the characteristic signals from the UPS elements and transmitting the characteristic signals, or signals corresponding to the characteristic signals, to the data processing apparatus;
    whereby the data processing apparatus receiving the signals from the first antenna and the at least second antenna corresponding to the characteristic signals from the UPS elements determines a location of each transmitting UPS element associated with each characteristic signal as at least one moving UPS elements moves, based on a time of flight defined by a transmit time at which each characteristic signal is transmitted and a receipt time at which each characteristic signal is received by the antennas thereby providing an indication of at least a direction or rate, or both, of the movement of the at least one moving UPS element.

8. The position monitoring system of claim 7, comprising a third antenna coupled to the first signal receiver or another signal receiver, and positioned for receiving the characteristic signals from the UPS elements.

9. The position monitoring system of claim 7, wherein the UPS elements are embedded in a fluid material and the characteristic signals transmitted by the UPS elements entrained in the moving fluid material provide an indication of at least a direction or rate, or both, of movement of the fluid material.

10. The position monitoring system of claim 7 wherein at least some of the plurality of UPS elements further comprise a receiver for receiving signals from the antennas.

11. The position monitoring system of claim 7 wherein at least some of the plurality of UPS elements comprise an acoustic receiver, the system further comprising a plurality of acoustic transmitters for transmitting acoustic signals to the plurality of the UPS elements.

12. The position monitoring system of claim 7 wherein the emr signal is a very low frequency (VLF) signal.

13. The position monitoring system of claim 7 wherein at least some of the plurality of UPS elements are capable of receiving and retransmitting characteristic signals from others of the plurality of UPS elements.

14. For use in a position monitoring system for monitoring motion in a subsurface environment, comprising at least a first antenna coupled to a first signal receiver and positioned for receiving characteristic signals from the UPS elements and transmitting the characteristic signals to a data processing apparatus, an underground positioning system (UPS) element comprising at least:

a housing, and a signal transmitter contained within the housing, for transmitting a characteristic emr signal having an identifier for associating the signal with the UPS element, whereby the data processing apparatus receiving the signals from the at least first antenna corresponding to the characteristic signals from the UPS elements determines a location of each UPS element associated with each characteristic signal as at least one moving UPS element moves, based on data from which time of flight data can be derived associated with each characteristic signal received by the at least first antenna, the characteristic signals transmitted by the UPS elements thereby providing an indication of at least a direction or rate, or both, of movement of the at least one moving UPS element.

15. The UPS element of claim 14 wherein the UPS element further comprises an acoustic receiver.

16. The UPS element of claim 14 wherein the emr signal is a very low frequency (VLF) signal.

17. The UPS element of claim 14 wherein the system the UPS element further comprises a receiver for receiving signals from the antennas and an atomic clock for providing data to signals received from the antennas, wherein the system further determines at least a direction or rate, or both, of movement of the at least one moving UPS element, based on the relative time the signals from the antennae are received by the UPS element.

18. The UPS element of claim 14 wherein the UPS element is capable of receiving and retransmitting characteristic signals from others of the plurality of UPS elements.

19. A method for monitoring motion in a subsurface environment, comprising the steps of:

a. locating a plurality of underground positioning system (UPS) elements within the subsurface environment, each UPS element comprising at least a signal transmitter for transmitting a characteristic emr signal having an identifier for associating the characteristic signal with the transmitting UPS element;

b. receiving the emr signals from the plurality of UPS elements at a first position in communication with the UPS elements, and transmitting data to a data processing apparatus corresponding to a time of receiving each emr signal at the first position;

c. receiving the emr signals from the plurality of UPS elements at least at a second position in communication with the UPS elements, and transmitting data to the data processing apparatus corresponding to a time of receiving each emr signal at the second position; and d. processing the data to determine at least a direction or rate, or both, of movement of at least one moving UPS element.

20. The method of claim 19, comprising before step d. the step of receiving the emr signals from the plurality of UPS elements at least at a third position in communication with the UPS elements, and transmitting data to the data processing apparatus corresponding to a time of receiving each emr signal at the third position.

21. The method of claim 19 wherein comprising, before step d., the steps of the UPS elements receiving antenna signals from a signal source in communication with the UPS elements and transmitting data corresponding to a time of receiving each antenna signal at each UPS element.

22. The method of claim 21 wherein the antenna signal is a very low frequency (VLF) signal.

23. The method of claim 19 wherein the emr signals from the UPS elements are very low frequency (VLF) signals.

24. The method of claim 19 comprising, before step d., the further step of at least some of the UPS elements transmitting data to other UPS elements for retransmission by at least one of the other UPS elements to the data processing apparatus.

\* \* \* \* \*